US010754922B2

(12) United States Patent
Bradford

(10) Patent No.: US 10,754,922 B2
(45) Date of Patent: Aug. 25, 2020

(54) METHOD AND APPARATUS FOR SENSOR FUSION

(71) Applicant: Lockheed Martin Corporation, Bethesda, MD (US)

(72) Inventor: Bert Larue Bradford, Broomfield, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 645 days.

(21) Appl. No.: 15/137,695

(22) Filed: Apr. 25, 2016

(65) Prior Publication Data

US 2016/0314097 A1    Oct. 27, 2016

Related U.S. Application Data

(60) Provisional application No. 62/151,818, filed on Apr. 23, 2015.

(51) Int. Cl.
| | | |
|---|---|---|
| *G06F 17/18* | (2006.01) | |
| *G01S 13/86* | (2006.01) | |
| *G06K 9/62* | (2006.01) | |
| *G01D 1/16* | (2006.01) | |
| *G06F 17/16* | (2006.01) | |
| *G01S 13/72* | (2006.01) | |

(52) U.S. Cl.
CPC ........... *G06F 17/18* (2013.01); *G01D 1/16* (2013.01); *G01S 13/86* (2013.01); *G06F 17/16* (2013.01); *G06K 9/6288* (2013.01); *G01S 13/726* (2013.01); *G06K 9/6212* (2013.01); *G06K 9/6255* (2013.01); *G06K 9/6289* (2013.01)

(58) Field of Classification Search
CPC .................................................... G06F 17/18; G06F 17/16; G01D 1/16; G01S 13/86; G01S 13/726; G06K 9/6288; G06K 9/6212; G06K 9/6255; G06K 9/6289
USPC ......................................................... 702/189
See application file for complete search history.

(56) References Cited

U.S. PATENT DOCUMENTS 5,798,942 A * 8/1998 Danchick .............. G01S 3/7864
                                                                        342/36
5,894,323 A    4/1999 Kain et al.
(Continued)

FOREIGN PATENT DOCUMENTS

DE    10 2007 019 445 A1    10/2008
JP       2010-281782 A       12/2010

OTHER PUBLICATIONS

Peter J. Bickel, et al.; Mathematical Statistics, pp. 470-471, Holden-Day, 1977.

(Continued)

*Primary Examiner* — Dzung Tran
(74) *Attorney, Agent, or Firm* — Oblon, McClelland, Maier & Neustadt, L.L.P.

(57) ABSTRACT

Aspects of the disclosure provide a method and an apparatus for sensor fusion. The method includes receiving, by a processor, track reports of at least a first sensor and a second sensor for sensor fusion, selecting a best track from at least the first sensor and the second sensor to reduce track error, determining a fused track that combines at least the first sensor and the second sensor and selecting one of the fused track and the best track as a system track of sensor fusion to minimize a system error.

17 Claims, 23 Drawing Sheets
(18 of 23 Drawing Sheet(s) Filed in Color)

(56) References Cited

U.S. PATENT DOCUMENTS

| | | |
|---|---|---|
| 6,694,283 B2 | 2/2004 | Alfano et al. |
| 7,576,681 B2 | 8/2009 | Chen et al. |
| 8,229,163 B2 | 7/2012 | Coleman et al. |
| 8,509,965 B2 | 8/2013 | Lin |
| 8,710,411 B1 | 4/2014 | LaPat |
| 2006/0259244 A1 | 11/2006 | Case |
| 2008/0036593 A1 | 2/2008 | Rose-Pehrsson et al. |
| 2011/0205103 A1 | 8/2011 | Nohara et al. |
| 2012/0133775 A1 | 5/2012 | Treado et al. |
| 2014/0032167 A1 | 1/2014 | Mayer et al. |
| 2014/0354647 A1 | 12/2014 | Verret |

OTHER PUBLICATIONS

Steven M. Kay; Fundamentals of Statistical Signal Processing: Estimation Theory, pp. 44, 97, 573-575, Prentice Hall, 1993.

Ben Noble et al.; Applied Linear Algebra, p. 408, Prentice Hall, 1977.

International Search Report and Written Opinion dated Jun. 29, 2016 in PCT/US2016/029177 (English Translation Only).

Takashi Matsuzaki et al: "Distributed Data Fusion with Data T/R Control for Target Tracking", SICE Annual Conference (SICE), 2012 Proceedings of, IEEE, XP032259808, Aug. 20, 2012, pp. 701-706.

Abdolreza Dehghani Tafti et al., "Novel Adaptive Kalman Filtering and Fuzzy Track Fusion Approach for Real Time Applications", Industrial Electronics and Applications, XP031293699, Jun. 3, 2008, pp. 120-125.

Qiao Xiangdong et al., "A Modified Adaptive Track Fusion Approach", Information Fusion, 2002. Proceedings of the Fifth International Conference on Jul. 8-11, 2002, vol. 2, XP010594376, Jul. 8, 2002, pp. 1535-1541.

Chee-Yee Chong et al., "Architectures and Algorithms for Track Association and Fusion", IEEE Aerospace and Electronic Systems Magazine, vol. 15, No. 1, XP011090168, Jan. 1, 2000, pp. 5-13.

* cited by examiner

Table 8 Normalized RMSE Metric

| Case | S1 Normal RMSE | S1 RMSE | S2 Normal RMSE | S2 RMSE | Fuse Normal RMSE | Fuse RMSE | Select Normal RMSE | Select RMSE | Ideal RMSE |
|---|---|---|---|---|---|---|---|---|---|
| 11 | 1.087 | 259.1 |  | 1630.6 |  | 248.7 | 1.045 | 249.1 | 238.4 |
| 12 | 1.207 | 258.2 |  | 1664.4 |  | 224.5 | 1.088 | 232.7 | 213.9 |
| 13 | 1.255 | 259.1 |  | 1630.6 | 1.635 | 337.6 |  | 253.4 | 206.4 |
| 14 | 1.157 | 259.1 |  | 1630.6 | 1.329 | 297.5 |  | 252.3 | 223.9 |
| 15 | 1.240 | 259.1 |  | 1619.1 | 1.388 | 289.8 |  | 244.7 | 208.9 |
| 21 | 1.114 | 261.0 |  | 1650.8 | 1.041 | 243.8 | 1.063 | 248.8 | 234.2 |
| 22 | 1.286 | 250.9 |  | 1651.5 |  | 211.1 | 1.131 | 220.7 | 195.1 |
| 23 | 1.243 | 261.0 |  | 1650.8 | 2.094 | 439.5 |  | 253.0 | 209.9 |
| 24 | 1.168 | 261.0 |  | 1650.8 | 1.582 | 353.4 |  | 252.8 | 223.4 |
| 25 | 1.258 | 256.6 |  | 1678.4 | 1.779 | 362.9 |  | 236.0 | 203.9 |
| 31 | 1.148 | 259.1 |  | 1630.6 |  | 239.0 | 1.077 | 243.0 | 225.7 |
| 32 | 1.301 | 258.2 |  | 1664.4 |  | 224.2 | 1.177 | 233.5 | 198.4 |
| 33 |  | 259.1 |  | 1630.6 | 2.819 | 607.1 | 1.245 | 268.3 | 215.4 |
| 34 | 1.173 | 259.1 |  | 1630.6 | 2.075 | 458.4 |  | 258.7 | 221.0 |
| 35 | 1.241 | 259.1 |  | 1619.1 | 2.257 | 471.3 |  | 257.3 | 208.8 |
| Average | 1.206 |  |  |  | 1.557 |  |  |  |  |

*FIG. 22*

Table 9 Normalized R90SE Metric

| Case | S1 Normal R90SE | S1 R90SE | S2 Normal R90SE | S2 R90SE | Fuse Normal R90SE | Fuse R90SE | Select Normal R90SE | Select R90SE | Ideal R90SE |
|---|---|---|---|---|---|---|---|---|---|
| 11 | 1.109 | 392.7 | | 2777.4 | | 369.6 | | 369.6 | 354.2 |
| 12 | 1.188 | 389.3 | | 2674.6 | | 343.6 | | 358.6 | 327.7 |
| 13 | | 392.7 | | 2777.4 | 1.546 | 481.3 | | 380.3 | 311.3 |
| 14 | | 392.7 | | 2777.4 | 1.238 | 411.7 | | 384.6 | 332.5 |
| 15 | | 392.5 | | 2673.4 | 1.261 | 401.1 | | 377.9 | 318.0 |
| 21 | 1.112 | 398.3 | | 2771.5 | | 373.4 | 1.072 | 384.0 | 358.1 |
| 22 | 1.274 | 377.1 | | 2728.1 | | 322.2 | 1.144 | 338.7 | 296.1 |
| 23 | | 398.3 | | 2771.5 | 2.163 | 671.5 | | 386.3 | 310.5 |
| 24 | | 398.3 | | 2771.5 | 1.402 | 485.9 | | 384.7 | 346.6 |
| 25 | | 384.8 | | 2874.9 | 1.471 | 455.1 | | 353.8 | 309.3 |
| 31 | 1.170 | 392.7 | | 2777.4 | | 355.6 | 1.094 | 367.2 | 335.6 |
| 32 | 1.242 | 389.3 | | 2674.6 | | 343.1 | | 355.2 | 313.4 |
| 33 | | 392.7 | | 2777.4 | 2.936 | 956.7 | | 407.6 | 325.8 |
| 34 | | 392.7 | | 2777.4 | 1.805 | 589.6 | | 392.7 | 326.7 |
| 35 | | 392.5 | | 2673.4 | 1.841 | 585.0 | | 394.8 | 317.8 |
| Average | | | | | 1.469 | | | | |

FIG. 23

METHOD AND APPARATUS FOR SENSOR FUSION

INCORPORATION BY REFERENCE

This present disclosure claims the benefit of U.S. Provisional Application No. 62/151,818, "FUSION SELECTION ALGORITHM" filed on Apr. 23, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Sensor fusion combines sensory data or data derived from disparate sources. Sensor fusion can be used to reduce uncertainty such that the resulting information from sensor fusion has less uncertainty than the individual sources.

SUMMARY

Aspects of the disclosure provide a method for sensor fusion. The method includes receiving, by a processor, track reports of at least a first sensor and a second sensor for sensor fusion, selecting a best track from at least the first sensor and the second sensor to reduce track error, determining a fused track that combines at least the first sensor and the second sensor and selecting one of the fused track and the best track as a system track of sensor fusion to minimize a system error.

To select the best track from at least the first sensor and the second sensor to reduce track error, in an embodiment, the method includes selecting the best track based on at least one of a-priori knowledge of sensor performance and minimization of a covariance volume.

According to an aspect of the disclosure, to select one of the fused track and the best track as the system track to minimize the system error, the method includes selecting the fused track as the system track when a first error ellipsoid of the best track contains a second error ellipsoid of the fused track, the method includes calculating a first volume of the first error ellipsoid of the best track, calculating a second volume of the second error ellipsoid of the fused track, calculating a third volume of intersection of the first error ellipsoid and the second ellipsoid and determining whether the first error ellipsoid contains the second error ellipsoid based on the first volume, the second volume and the third volume.

To determine whether the first error ellipsoid contains the second error ellipsoid based on the first volume, the second volume and the third volume, in an embodiment, the method includes calculating a first volume ratio of the third volume to the first volume, calculating a second volume ratio of the third volume to the second volume, and determining that the first error ellipsoid contains the second error ellipsoid when the first volume ratio is smaller than a first threshold, and the second volume ratio is larger than a second threshold.

Further, in an embodiment, the method includes determining the first threshold and the second threshold based on simulated track reports.

In addition, in an embodiment, the best track is a first best track and the fused track is a first fused track, the system track is a first system track, and the method includes selecting a second best track from the first system track and a third sensor to reduce track error, determining a second fused track that combines the first system track and the third sensor, and selecting one of the second fused track and the second best track as a second system track to minimize a system error.

Aspects of the disclosure provide an apparatus that includes a processor and memory configured to store software instructions to be executed by the processor for sensor fusion. The processor is configured to receive track reports of at least a first sensor and a second sensor for sensor fusion, select a best track from the first sensor and the second sensor to reduce track error, determine a fused system track that combines the first sensor and the second sensor, and select one of the fused system track and the best track to minimize a system error.

Aspects of the disclosure provide a non-transitory computer readable medium storing program instructions for causing a processor to execute operations for sensor fusion. The operations include receiving track reports of at least a first sensor and a second sensor for sensor fusion, selecting a best track from at least the first sensor and the second sensor to reduce track error, determining a fused system track that combines at least the first sensor and the second sensor, and selecting one of the fused system track and the best track to minimize a system error.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various embodiments of this disclosure that are proposed as examples will be described in detail with reference to the following figures, wherein like numerals reference like elements, and wherein:

FIG. 22 shows Table 8 for normalized RMSE metric; and

FIG. 23 shows Table 9 for normalized R90SE metric.

DETAILED DESCRIPTION OF EMBODIMENTS

Figure 1:
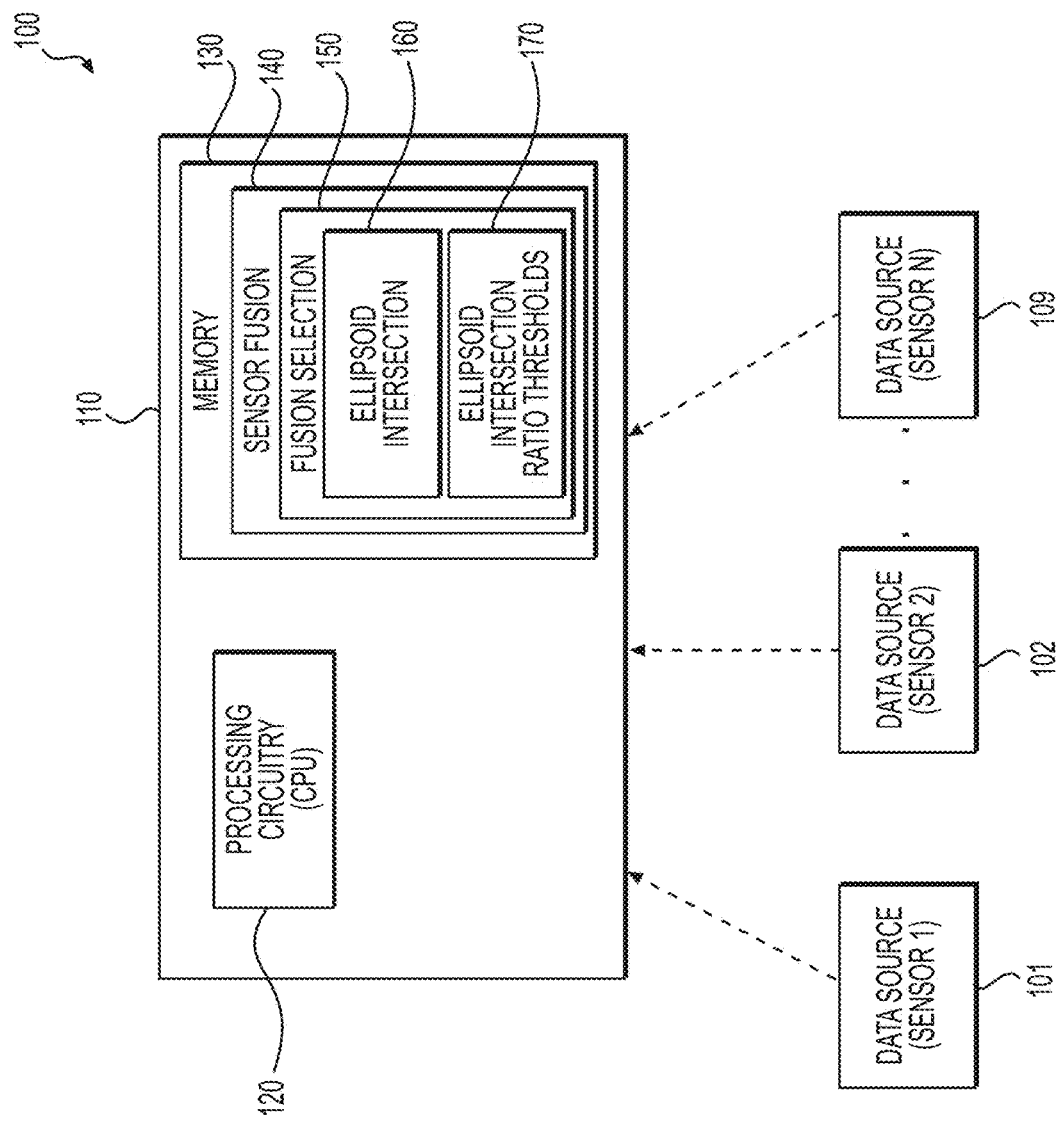
FIG. 1 shows a block diagram of an electronic system 100 according to an embodiment of the disclosure.

FIG. 1 shows a block diagram of an electronic system 100 configured to perform data (sensor) fusion according to an embodiment of the disclosure. The electronic system 100 includes a computing device 110 and a plurality of data sources 101-109. The computing device 110 is configured to receive data, such as track reports, from the plurality of data sources 101-109. Further, the computing device 110 is configured to select a best track from two or more data sources, determine a fused system track that combines two or more data sources, and select one of the fused system track and the best track to minimize a system error.

The computing device 110 can include any suitable computing device, such as one or more computers, a server device, a desktop computer, a laptop computer, a tablet computer, a distributed computer system, an embedded computer system, and the like.

The data sources 101-109 can be any suitable data sources. In an example, the data sources 101-109 are sensors configured to generate sensing data in real time, and provide the sensing data, for example in tracking report format, to the computing device 110. The sensors can have the same type or can be different. For example, the data source 101 includes a radar (RF) sensor system and the data source 102 includes an infrared (IR) sensor system.

In another example, the data sources 101-109 include memory devices configured to store tracking reports respectively for sensors, and can provide the tracking reports to the computing device 110 at any suitable time.

Further, in the FIG. 1 example, the computing device 110 includes processing circuitry 120 and memory 130. The processing circuitry 120 can include any suitable processing hardware. In an example, the processing circuitry 120 includes one or more central processing unit (CPU). It is noted that, in an example, when the processing circuitry 120 includes multiple CPUs, the multiple CPUs can be disposed in one computer, or can be distributed in different computers and suitably coupled to enable parallel processing.

The memory 130 can include any suitable storage medium, such as a magnetic disk, an optical disk, a solid state disk, and the like. The memory 130 is configured to store various software instructions and various data. In the FIG. 1 example, the memory 130 stores sensor fusion module 140 that includes software instructions for sensor fusion. The software instructions in the sensor fusion module 140 can be executed by the processing circuitry 120 to perform sensor fusion. Further, the memory 130 can store received data from the plurality of data sources 101-109, intermediate data for sensor fusion, and results of sensor fusion.

It is noted that while the description of the sensor fusion module 140 is used at the track level fusion, the sensor fusion module 140 can be suitably modified for measurement level fusion.

According to an aspect of the disclosure, a track report from a sensor can include time, estimated state vector (e.g., position, velocity, acceleration) and the corresponding covariance matrix. The covariance matrix may be interpreted as an error ellipsoid, which defines the volume of uncertainty of the estimated state vector. It is noted that while the description of the present disclosure uses position vector as an example, similar operations can be respectively conducted on other vectors, such as velocity, acceleration, and the like.

According to disclosure, the performance of track level fusion is dependent on the consistency of the covariance matrix with the true state vector error statistics. When the covariance matrices are consistent, then the track level fusion reduces the average state vector errors relative to the contributing sensor tracks. On the other hand, inconsistent covariance matrices may result in the loss of this optimality property of track level fusion. In this case, the fused state vector errors may be greater than that for the contributing sensors.

According to an aspect of the disclosure, the sensor fusion module 140 includes a fusion selection module 150 that includes software instructions to implement a fusion selection algorithm (FSA). When the fusion selection module 150 is executed by the processing circuitry 120, the computing device 110 performs fusion selection. Specifically, the computing device 110 determines a fused state vector that combines estimated state vectors from multiple sensors, and selects the estimated state vector from a contributing sensor or the fused state vector as a system track. The system track can minimize the average state vector errors. In an embodiment, the FSA can be applied to dissimilar sensors, such as an infrared (IR) system and a radar (RF) sensor system, and can result in a significant improvement of sensor fusion performance.

In an embodiment, the FSA is applied to two tracks each time to determine a system track to minimize the average state vector errors. Further, the FSA is recursively applied to, for example, the system track from previous application of FSA and an additional contributing sensor. Thus, the FSA can be extended to sensor fusion of any combination of three or more sensors.

According to an aspect of the disclosure, the FSA selects one of the fused track and the contributing sensor as the system track based on ellipsoid intersection computation. In the FIG. 1 example, the fusion selection module 150 can use an ellipsoid intersection module 160 and an ellipsoid intersection ratio thresholds module 170 to assist the selection. The ellipsoid intersection module 160 includes software instructions to be executed by the processing circuitry 120 to cause a computation of the volume of the intersection of error ellipsoids. An example of software instructions for the ellipsoid intersection module 160 is shown in Appendix C. The ellipsoid intersection ratio thresholds module 170 includes software instructions to be executed by the processing circuitry 120 to cause a determination of thresholds for track selection. An example of software instructions for the ellipsoid intersection ratio thresholds module 170 is shown in Appendix A and Appendix B.

In an embodiment, two tracks are used in each application of FSA. In an example, state vector estimates are regarded as observations according to a linear model shown in Eq. 1:

$$\begin{bmatrix} z_1 \\ z_2 \end{bmatrix} = \begin{bmatrix} I \\ I \end{bmatrix} x + \begin{bmatrix} n_1 \\ n_2 \end{bmatrix} \quad \text{Eq. 1}$$

where:
- $z_1$ state vector estimate for Sensor 1
- $z_2$ state vector estimate for Sensor 2
- x true state vector
- $n_1$ Sensor 1 noise
- $n_2$ Sensor 2 noise In an example, the noise vector is assumed to be Gaussian with zero mean and covariance as shown in Eq. 2:

$$C = \begin{bmatrix} C_1 & 0 \\ 0 & C_2 \end{bmatrix} \quad \text{Eq. 2}$$

where:
- C covariance matrix for track reports from all sensors
- $C_1$ covariance matrix for Sensor 1
- $C_2$ covariance matrix for Sensor 2

It is noted that, in an example, the state vector estimates are assumed to be uncorrelated. The minimum variance unbiased (MVU) estimator and the corresponding covariance are shown in Eq. 3:

$$\begin{aligned} C_{\hat{x}} &= \left[ [I\ I] \begin{bmatrix} C_1^{-1} & 0 \\ 0 & C_2^{-1} \end{bmatrix} \begin{bmatrix} I \\ I \end{bmatrix} \right]^{-1} \\ &= (C_1^{-1} + C_2^{-1})^{-1} \\ \hat{x} &= C_{\hat{x}} [I\ I] \begin{bmatrix} C_1^{-1} & 0 \\ 0 & C_2^{-1} \end{bmatrix} \begin{bmatrix} z_1 \\ z_2 \end{bmatrix} \\ &= C_{\hat{x}} (C_1^{-1} z_1 + C_2^{-1} z_2) \end{aligned} \quad \text{Eq. 3}$$

where:
- $C_{\hat{x}}$ covariance for MVU estimator
- $\hat{x}$ MVU estimator

For the fusion of two tracks, an alternative form is shown in Eq. 4:

$$\begin{aligned} C_{\hat{x}} &= C_1(C_1 + C_2)^{-1} C_2 \\ &= C_2(C_1 + C_2)^{-1} C_1 \\ \hat{x} &= C_2(C_1 + C_2)^{-1} z_1 + C_1(C_1 + C_2)^{-1} z_2 \end{aligned} \quad \text{Eq. 4}$$

It is noted that the equations above can be applied recursively to a fused track and an additional source track. The result is equivalent to fusing all source tracks simultaneously, but reduces the number of matrix inversions. For example, for the fusion of three source tracks, the equivalence of the recursive algorithm is verified as follows in Eq. 5 and Eq. 6:

$$C_{\hat{y}} = (C_{\hat{x}}^{-1} + C_3^{-1})^{-1} = (C_1^{-1} + C_2^{-1} + C_3^{-1})^{-1} \quad \text{Eq. 5}$$

$$\hat{y} = C_{\hat{y}}(C_{\hat{x}}^{-1}\hat{x} + C_3^{-1} z_3) = C_{\hat{y}}(C_1^{-1} z_1 + C_2^{-1} z_2 + C_3^{-1} z_3) \quad \text{Eq. 6}$$

where:
- $z_3$ state vector estimate for Sensor 3
- $C_3$ covariance matrix for Sensor 3
- $\hat{y}$ MVU estimator for three tracks
- $C_{\hat{y}}$ covariance matrix for MVU estimator for three tracks The fusion performance metric is based on the optimality property of the MVU estimator utilized for track level fusion. According to an aspect of the disclosure, a Monte Carlo simulation can be utilized to demonstrate the impact of covariance consistency on track level fusion performance. The covariance matrices $C_1, C_2$ are fixed and for convenience the true state vector is x=0. For each of N Monte Carlo trials, the state vector estimates $z_1, z_2$ are generated randomly with the corresponding covariance matrices $C_1, C_2$ and the MVU estimator $\hat{x}_i$ is computed. The sample covariance matrix ($\hat{C}$) corresponding to $\hat{x}_i$ is shown in Eq. 7:

$$\hat{C} = 1/N \sum_{i=1}^{N} \hat{x}_i \hat{x}_i^T \quad \text{Eq. 7}$$

The trace of $\hat{C}$ is the mean square error (MSE) and is shown in Eq. 8:

$$\text{tr}(\hat{C}) = \sum_{j=1}^{3} \hat{C}_{jj} = \sum_{j=1}^{3} \left( 1/N \sum_{i=1}^{N} \hat{x}_{ij}^2 \right) = \frac{1}{N} \sum_{i=1}^{N} \left( \sum_{j=1}^{3} \hat{x}_{ij}^2 \right) = \frac{1}{N} \sum_{i=1}^{N} |\hat{x}_i|^2 \quad \text{Eq. 8}$$

In an example, the MVU estimator minimizes the trace (tr) of the covariance for any unbiased estimator as shown in Eqs. 8-9:

$$tr(\hat{C}) \leq tr(C_1) \quad \text{Eq. 8}$$

$$tr(\hat{C}) \leq tr(C_2) \quad \text{Eq. 9}$$

Thus, the MVU estimator attains the minimum mean square error (MMSE). Since the square root function is monotone increasing, it preserves the inequalities above. The fusion performance metric is the root mean square error (RMSE) and is shown in Eq. 10

$$\text{RMSE} = (1/N \sum_{i=1}^{N} |\hat{x}_i|^2)^{1/2} \quad \text{Eq. 10}$$

The definition of covariance consistency is based on Mahalanobis distance, also known as normalized estimation error squared (NEES). Mahalanobis distance is a normalized state vector error, which utilizes all three axes of the error ellipsoid and indicates containment of the true state vector within the error ellipsoid. Mahalanobis distance relative to the true state vector in 3 dimensions is defined as shown in Eq. 11:

$$D = (\hat{x} - x)^T C^{-1} (\hat{x} - x) \quad \text{Eq. 11}$$

where:
- x True state vector (position or velocity)
- $\hat{x}$ Estimated state vector
- C Covariance matrix of the estimated state vector
- D Mahalanobis distance The relationship between Mahalanobis distance and the error ellipsoid is revealed by representing C in terms of its eigenvectors and eigenvalues, as shown in Eq. 12:

$$C = V \Lambda V^T \quad \text{Eq. 12}$$

where:
V Orthogonal matrix of eigenvectors
Λ Diagonal matrix of eigenvalues $\sigma_i^2$ The eigenvectors define the direction of the error ellipsoid axes and the error vector y in this coordinate system is defined by Eq. 13:

$$y = V^T(\hat{x} - x) \quad \text{Eq. 13}$$

This change of variables reveals that Mahalanobis distance is directly related to the equation of the error ellipsoid and shown in Eq. 14:

$$\begin{aligned} D &= (\hat{x} - x)^T C^{-1}(\hat{x} - x) \\ &= (\hat{x} - x)^T V \Lambda^{-1} V^T (\hat{x} - x) \\ &= y^T \Lambda^{-1} y \\ &= [y_1 \ y_2 \ y_3] \begin{bmatrix} \sigma_1^{-2} & 0 & 0 \\ 0 & \sigma_2^{-2} & 0 \\ 0 & 0 & \sigma_3^{-2} \end{bmatrix} \begin{bmatrix} y_1 \\ y_2 \\ y_3 \end{bmatrix} \\ &= \frac{y_1^2}{\sigma_1^2} + \frac{y_2^2}{\sigma_2^2} + \frac{y_3^2}{\sigma_3^2} \end{aligned} \quad \text{Eq. 14}$$

The equation of the error ellipsoid is obtained by setting the Mahalanobis distance equal to a constant. Since the standard deviations are scaled by 3, the threshold for containment of the true state vector is 9, as shown in Eq. 15:

$$D = \frac{y_1^2}{\sigma_1^2} + \frac{y_2^2}{\sigma_2^2} + \frac{y_3^2}{\sigma_3^2} \leq 9 \quad \text{Eq. 15}$$

It is noted that Mahalanobis distance is measured along each axis of the error ellipsoid in terms of standard deviations, which are subsequently squared and summed. If one of the standard deviations is unrealistically small, then the Mahalanobis distance is very large and the threshold for containment of the true state vector is exceeded. Assuming that the error vector is Gaussian, this expression for Mahalanobis distance reveals that it is a chi-square random variable with 3 degrees of freedom. Thus, the 97% probability threshold for Mahalanobis distance is approximately 9.

According to an aspect of the disclosure, covariance consistency is defined as the 97% of a sample of Mahalanobis distance values normalized by the theoretical value of 9. Perfect covariance consistency is 1.0. A value greater than 1.0 indicates that the covariance is under-sized. A value less than 1.0 indicates that the covariance is over-sized.

Two examples are presented to clarify the definition of covariance consistency and describe a common cause of inconsistent covariance matrices. These examples are based on simulated angle measurements from two IR sensors on geosynchronous satellites observing a stationary target. The target and sensor positions are presented in Table 1. The angle measurement noise statistics are presented in Table 2. The true standard deviation is utilized to simulate the angle measurements, while the estimated standard deviation is utilized in the algorithms for estimating the target position.

Figure 6:
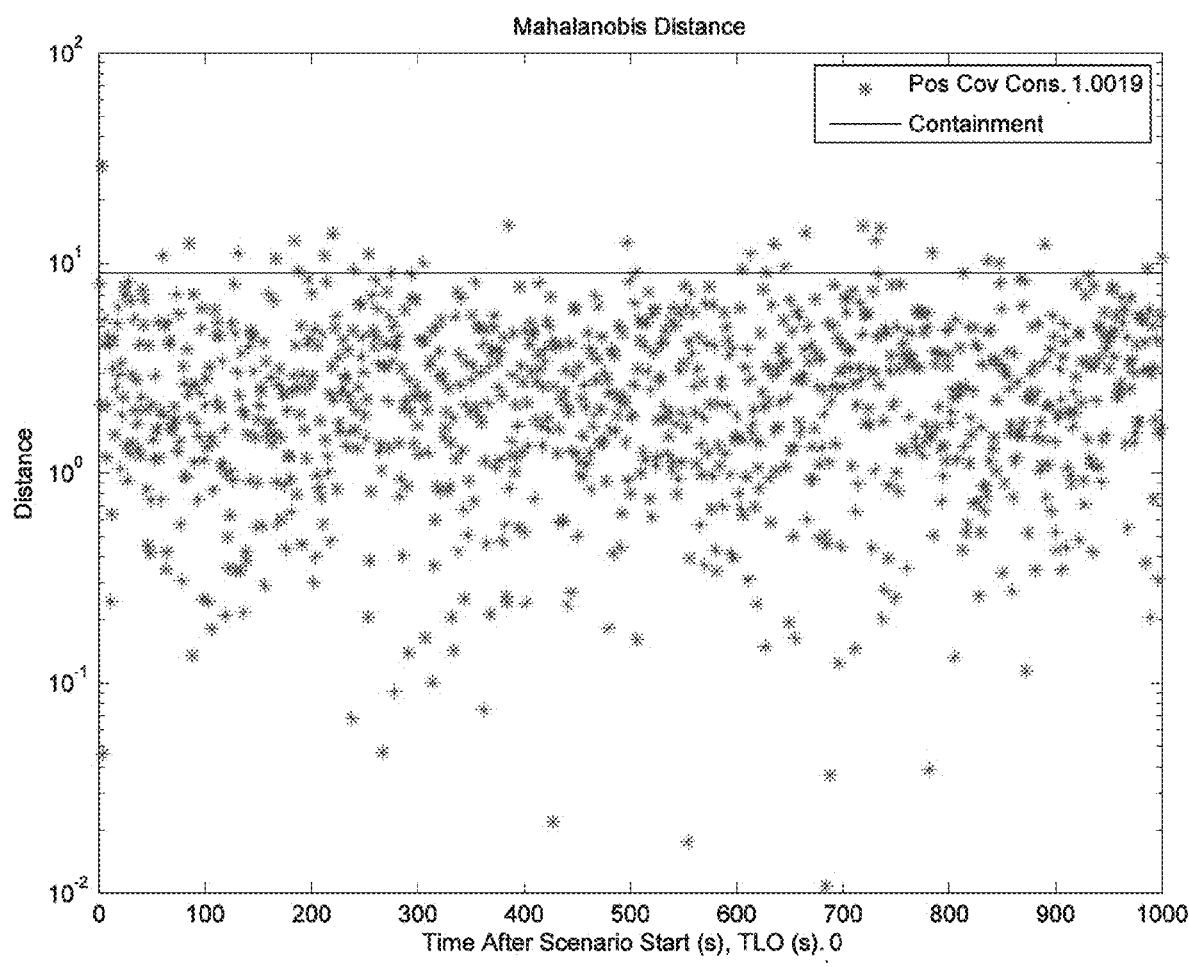
FIG. 6 shows a plot of consistent measurement noise statistics.
Figure 7:
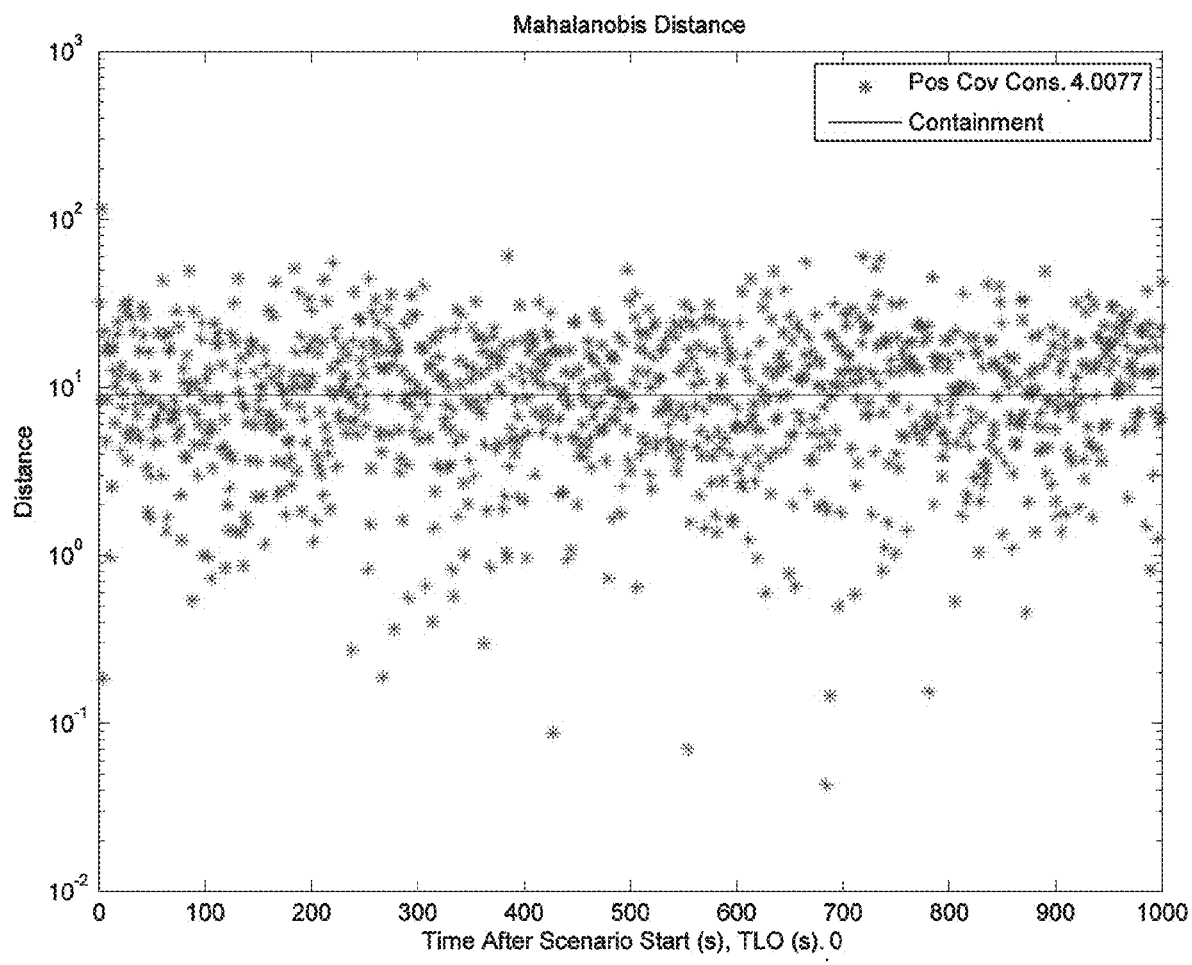
FIG. 7 shows a plot of inconsistent measurement noise statistics.

If these are equal, then the measurement noise statistics are described as consistent. Otherwise, the measurement noise statistics are inconsistent. The initial estimate of the target position is obtained by triangulation. This is followed by the non-linear least squares algorithm, which corrects the estimated target position and produces a corresponding covariance matrix. For consistent measurement noise statistics, the Mahalanobis distance for 1000 Monte Carlo trials are presented in FIG. 6. As expected for this case, the covariance consistency attains the perfect value of 1.0. For inconsistent measurement noise statistics, the Mahalanobis distance for 1000 Monte Carlo trials are presented in FIG. 7. Since the angle measurement noise is scaled by 0.5, the covariance of the estimated target position is scaled by 0.25 and Mahalanobis distance is scaled by 4.0. Consequently, the covariance consistency is 4.0. This example of inconsistent measurement noise statistics can be encountered in practice.

TABLE 1

Target and Sensor Positions

|  | Target | Sensor 1 | Sensor 2 |
| --- | --- | --- | --- |
| Lat (deg) | 0 | 0 | 0 |
| Lon (deg) | 0 | +45 | −45 |
| Alt (m) | 0 | 35786e3 | 35786e3 |

TABLE 2

Angle Measurement Noise

|  | Consistent | Inconsistent |
| --- | --- | --- |
| Std Tru (rad) | 1.0e−5 | 1.0e−5 |
| Std Est (rad) | 1.0e−5 | 5.0e−6 |

Figure 8:
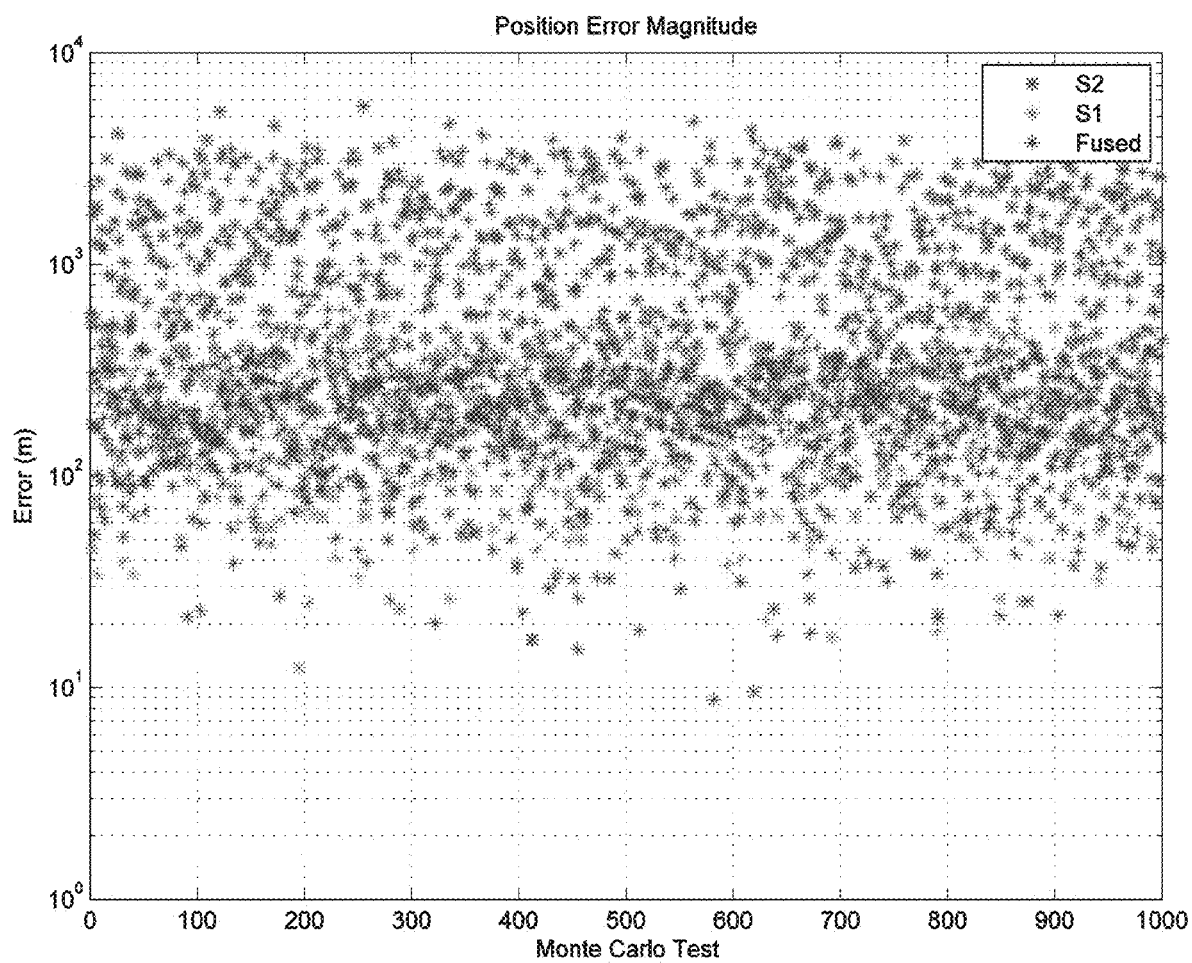
FIG. 8 shows a plot of sensor fusion results: consistent covariance.

Two examples are presented to demonstrate the benefit of sensor fusion, as well as the impact of inconsistent covariance matrices. These examples are based on simulated track reports (estimated position vector and corresponding covariance matrix) from two sensors. Sensor 1 is representative of a radar (RF) and Sensor 2 is representative of an IR sensor system with significantly larger position errors. The position error ellipsoid axes are presented in Table 3 and the spatial orientation of the axes is selected randomly. The position covariance matrices $C_1, C_2$ are fixed and the estimated position vectors are generated randomly consistent with the corresponding covariance matrices. Track level fusion is performed and the results are presented in Table 4 and FIG. 8. For consistent covariance matrices, the optimality property of the MVU estimator is applicable and the fused estimate attains the minimum RMSE. Despite the fact that the Sensor 2 RMSE is significantly larger than the Sensor 1 RMSE, there is a benefit from sensor fusion.

TABLE 3

Position Error Ellipsoid Axes

|  | Axis 1 (m) | Axis 2 (m) | Axis 3 (m) |
| --- | --- | --- | --- |
| Sensor 1 | 18 | 180 | 180 |
| Sensor 2 | 163 | 163 | 1630 |

TABLE 4

Covariance Consistency Impact on Sensor Fusion

| | Sensor 1 RMSE (m) | Sensor 2 RMSE (m) | Fused RMSE (m) |
|---|---|---|---|
| Consistent Cov | 251 | 1652 | 211 |
| Inconsistent Cov | 261 | 1651 | 440 |

Inconsistent covariance matrices are simulated as follows. First, the estimated position vectors for Sensor 2 are generated randomly consistent with the corresponding covariance matrix $C_2$. Second, a random scale factor is applied to $C_2$ prior to performing track level fusion. The motivation for this approach is to simulate incorrect measurement noise statistics. In Table 2, the estimated measurement noise standard deviation is scaled by a constant value of 0.5. In this case, the estimated measurement noise standard deviation is scaled by a random variable in the interval [0.1, 1.0]. Using MATLAB notation, the scaling of covariance matrix $C_2$ is implemented as in Eqs. 16-18:

$$x = rand - 1.0 \qquad \text{Eq. 16}$$

$$cs = 10^x; \% \text{ Covariance scale factor} \qquad \text{Eq. 17}$$

$$C2 = (cs^2) * C2 \qquad \text{Eq. 18}$$

Figure 9:
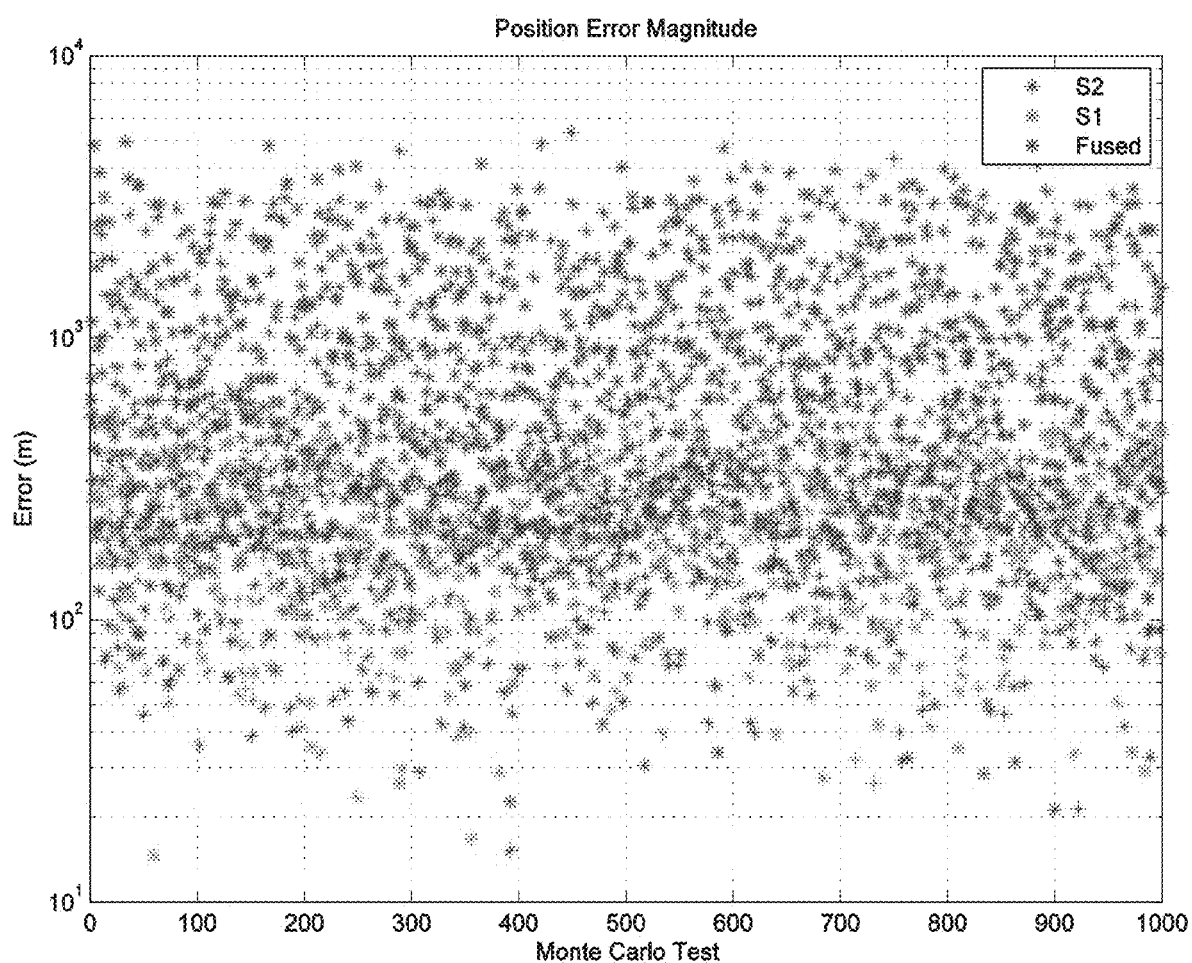
FIG. 9 shows a plot of sensor fusion results: inconsistent covariance.

Track level fusion is performed and the results are presented in Table 4 and FIG. 9. For inconsistent covariance matrices, the optimality property of the MVU estimator is not applicable and the fused estimate does not attain the minimum RMSE. In this case, the best state vector estimate available is from Sensor 1. This leads to the common practice of selecting the track report from the most accurate sensor rather than fusing track reports from all sensors.

Sensor fusion has the potential to reduce the average state vector errors, but may have a risk that inconsistent covariance matrices may result in an increase of the average state vector errors. According to an aspect of the disclosure, the fusion selection algorithm (FSA) is to select the estimated state vector (from a contributing sensor or fused), which minimizes the average state vector errors.

According to an embodiment of the disclosure, the fusion selection algorithm is configured to select either the fused state vector or the best sensor state vector in order to minimize the average system track errors. In an example, the fusion selection algorithm is designed for real-time operation and does not require the true target trajectory. The fusion selection algorithm compares the fused state/covariance to the best sensor state/covariance and selects the state/covariance most likely to minimize the true state vector errors. Furthermore, the recursive application of the fusion selection algorithm to a fused system track and an additional contributing sensor extends these benefits to any combination of three or more sensors.

Figure 2:
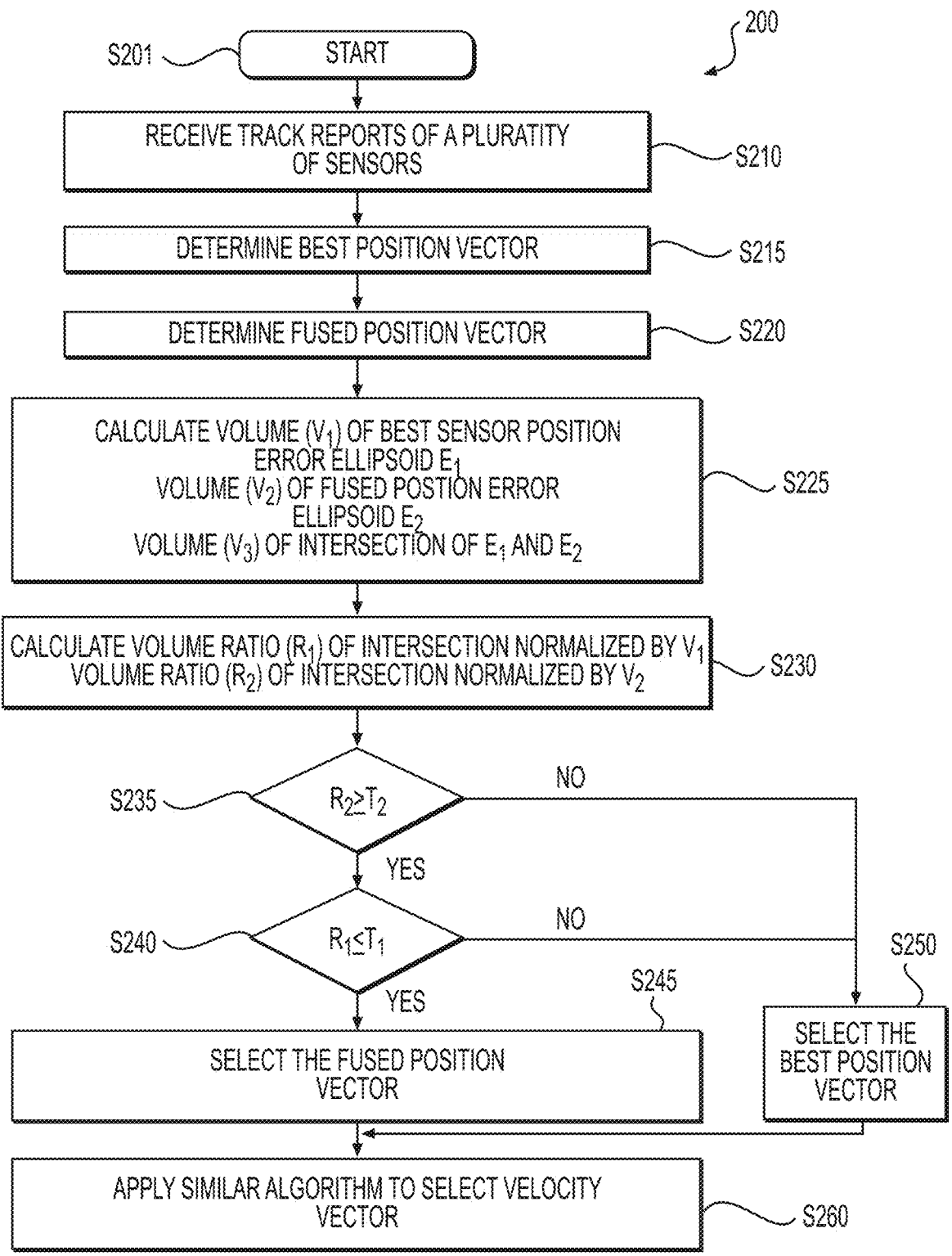
FIG. 2 shows a flow chart outlining a process 200 for fusion selection according to an embodiment of the disclosure.

FIG. 2 shows a flow chart outlining a process 200 for fusion selection according to an embodiment of the disclosure. In an example, the computing device 110 is configured to perform the process 200. The process 200 starts at S201 and proceeds to S210.

At S210, track reports of a plurality of sensors are received. In the FIG. 1 example, the computing device 110 receives track reports of a plurality of sensors from the data sources 101-109. A track report from a sensor can include time, estimated state vector (e.g., position, velocity, acceleration) and the corresponding covariance matrix. In the following steps, positon vector is used as an example. Similar steps can be performed on other suitable state vector, such as velocity, acceleration and the like.

At S215, the best sensor position vector ($x_1$) is determined. In the FIG. 1 example, the computing device 110 determines a best sensor position vector from the plurality of sensors. In an example, the computing device 110 determines a best sensor position vector from a first sensor and a second sensor. In an example, the best sensor is identified by a-priori knowledge of sensor performance or minimization of the covariance volume.

At S220, the fused position vector ($x_2$) is determined. In the FIG. 1 example, the computing device 110 determines the fused position vector that combines the position vectors from the plurality of sensors. In an example, the computing device 110 determines the fused sensor vector that combines the position vector from the first sensor and the second sensor.

At S225, volumes of error ellipsoids and intersection are calculated. In the FIG. 1 example, the computing device 110 calculates a first volume ($V_1$) of the best sensor position ellipsoid ($E_1$), a second volume ($V_2$) of the fused position error ellipsoid ($E_2$), and a third volume ($V_3$) of intersection of $E_1$ and $E_2$. An example of fast volume calculation is described in detail with reference to FIG. 3.

At S230, volume ratios are calculated. In the FIG. 1 example, the computing device 110 calculates a first volume ratio ($R_1 = V_3/V_2$) of the intersection to the first volume, and calculate a second volume ratio ($R_2 = V_3/V_2$) of intersection to the second volume.

At S235, the second volume ratio is compared with a second threshold ($T_2$). When the second volume ratio is equal and larger than the second threshold, the process proceeds to S240; otherwise, the process proceeds to S250.

At S240, the first volume ratio is compared with a first threshold ($T_1$). When the first volume ratio is equal or smaller than the first threshold, the process proceeds to S245; otherwise the process proceeds to S250.

At S245, the fused position vector ($x_2$) is selected as the system track for position vector. The process proceeds to S260.

At S250, the best position vector ($x_1$) is selected as the system track for position vector. The process proceeds to S260.

At S260, similar operations are used to select other state vectors, such as velocity vector, acceleration vector and the like.

In the FIG. 2 example and following descriptions, parameters are defined as:

$x_1$ Best sensor position vector
$C_1$ Best sensor position covariance matrix
$x_2$ Fused position vector
$C_2$ Fused position covariance matrix
$V_1$ Volume of best sensor position error ellipsoid $E_1$
$V_2$ Volume of fused position error ellipsoid $E_2$
$V_3$ Volume of intersection of $E_1$ and $E_2$
$R_1 = V_3/V_1$ Volume of intersection normalized by $V_1$
$R_2 = V_3/V_2$ Volume of intersection normalized by $V_2$ Further, in the FIG. 2 example, the first threshold $T_1$ and second threshold $T_2$ can be determined based on simulated track reports. An example of determining the first threshold and the second threshold is described in detail with reference to FIG. 4.

Figure 3:
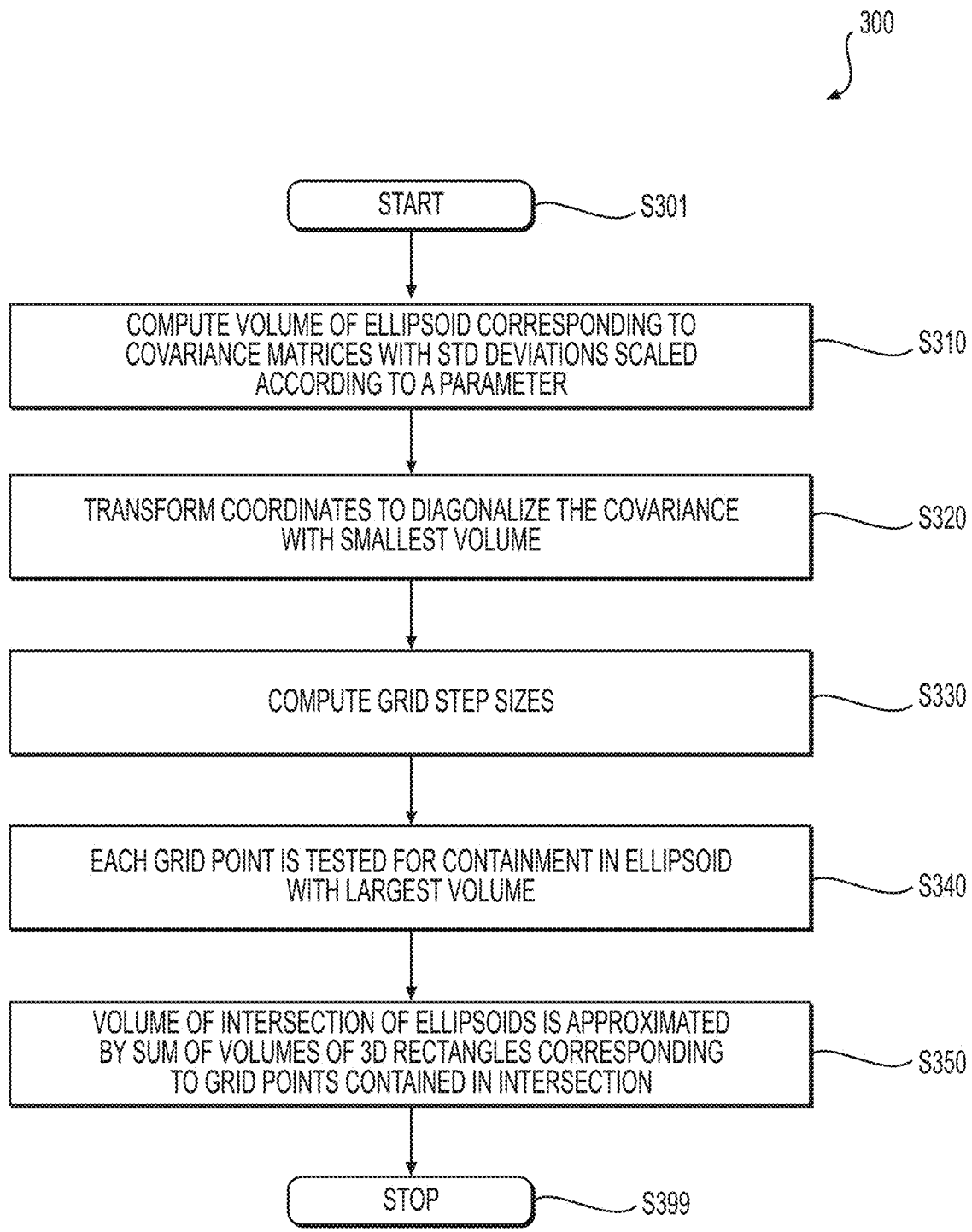
FIG. 3 shows a flow chart outlining a process 300 for calculating ellipsoid intersection volume according to an embodiment of the disclosure.

FIG. 3 shows a flow chart outlining a process 300 for calculating ellipsoid intersection volume according to an embodiment of the disclosure. An example of software instructions for the process 300 is shown in Appendix C. In an example, the computing device 110 executes the software instructions in Appendix C to perform the process 300. The process starts at S301 and proceeds to S310.

At S310, volume of ellipsoids corresponding to covariance matrices with standard deviations scaled according to a parameter is calculated. In the FIG. 1 example, the computing device 110 utilizes a scaling parameter value of 4. Then, the computing device 110 computes volume of ellipsoids corresponding to covariance matrices with standard deviations scaled according to the parameter. In an example, the volume of a full ellipsoid with axes is computed according to Eq. 19:

$$V=(4/3)\pi abc \qquad \text{Eq. 19}$$

At S320, transform coordinates to diagonalize the covariance with smallest volume. In the FIG. 1 example, the computing device 110 transforms coordinates to diagonalize the covariance with smallest volume, denoted by $C_1$, and the corresponding standard deviations are denoted by $\alpha, \beta, \gamma$.

At S330, grid steps are computed. In the FIG. 1 example the computing device 110 computes grid step sizes sx, sy, sz such that the ellipsoid with smallest volume may be approximated by 2N rectangles on each axis, such as shown in Eq. 20:

$$sx = \frac{4\alpha}{N} \quad sy = \frac{4\beta}{N} \quad sz = \frac{4\gamma}{N} \qquad \text{Eq. 20}$$

At S340 each grid point is tested for containment in the ellipsoid with largest volume. In the FIG. 1 example, the computing device 110 tests each grid point for containment in the ellipsoid with largest volume, corresponding to covariance $C_2$. The quadratic form corresponding to $C_2$ is expanded and computed as efficiently as possible within nested loops for the grid variables x, y. The inner loop for z is replaced by solving a quadratic equation. This algorithm used in the software instructions is a hybrid of numerical and analytical techniques, resulting in a significant reduction in execution time compared to related numerical methods.

At S350, the volume of the intersection of the ellipsoids is calculated. In an example, the volume of the intersection of the ellipsoids is approximated by the sum of the volume of the 3D rectangles corresponding to the grid points contained in the intersection. Then, the process proceeds to S399 and terminates.

Specifically, in the software instructions shown in Appendix C, inputs to the ellipsoid intersection function are:
$P_1$ State estimate 1
$C_1$ Covariance of $P_1$
$P_2$ State estimate 2
$C_2$ Covariance of $P_2$ Assume that the error ellipsoid of minimum volume corresponds to $C_1$. The other case is similar. Represent $C_1$ in terms of its eigenvectors and eigenvalues as shown in Eq. 21

$$C_1 = V \Lambda V^T \qquad \text{Eq. 21}$$

where:
V Orthogonal matrix of eigenvectors
$\Lambda$ Diagonal matrix of eigenvalues $\alpha^2, \beta^2, \gamma^2$ The eigenvectors define the direction of the error ellipsoid axes and a transformation of coordinates is defined by Eq. 22:

$$[x\ y\ z]^T = V^T(P-P_1) \qquad \text{Eq. 22}$$

In this coordinate system, Eqs 23-26 are shown:

$$\tilde{P}_1 = [0\ 0\ 0]^T \qquad \text{Eq. 23}$$

$$\tilde{C}_1 = \text{diag}(\alpha^2\ \beta^2\ \gamma^2) \qquad \text{Eq. 24}$$

$$\tilde{P}_2 = V^T(P_2-P_1) = [x_2\ y_2\ z_2]^T \qquad \text{Eq. 25}$$

$$\tilde{C}_2 = V^T C_2 V \qquad \text{Eq. 26}$$

According to an aspect of the disclosure, Mahalanobis distance is equivalent to the equation of an error ellipsoid. In linear algebra, this expression is known as a quadratic form. The quadratic form corresponding to $C_1$ is simplified by the coordinate transformation. The quadratic form corresponding to $C_2$ is expanded and computed as efficiently as possible within nested loops for the grid variables x, y. The inner loop for z is replaced by solving a quadratic equation.

The quadratic form corresponding to $C_1$ is shown in Eq. 27:

$$(P-\tilde{P}_1)^T \tilde{C}_1^{-1}(P-\tilde{P}_1) = [x\ y\ z]\text{diag}(\alpha^{-2}\ \beta^{-2}\ \gamma^{-2}) \qquad \text{Eq. 27}$$
$$[x\ y\ z]^T$$
$$= \frac{x^2}{\alpha^2} + \frac{y^2}{\beta^2} + \frac{z^2}{\gamma^2} \leq 16$$

The quadratic form corresponding to $C_2$ is shown in Eq. 28:

$$(P-\tilde{P}_2)^T \tilde{C}_2^{-1}(P-\tilde{P}_2) = [\Delta x\ \Delta y\ \Delta z]A[\Delta x\ \Delta y\ \Delta z]^T$$
$$= [\Delta x\ \Delta y\ \Delta z]\begin{bmatrix} a_{11}\Delta x + a_{12}\Delta y + a_{13}\Delta z \\ a_{21}\Delta x + a_{22}\Delta y + a_{23}\Delta z \\ a_{31}\Delta x + a_{32}\Delta y + a_{33}\Delta z \end{bmatrix}$$
$$= a_{11}\Delta x^2 + a_{22}\Delta y^2 + a_{33}\Delta z^2 + (a_{12}+a_{21})\Delta x \Delta y +$$
$$(a_{13}+a_{31})\Delta x \Delta z + (a_{23}+a_{32})\Delta y \Delta z$$
$$= a_{11}\Delta x^2 + a_{22}\Delta y^2 + a_{33}\Delta z^2 + 2a_{12}\Delta x \Delta y +$$
$$2a_{13}\Delta x \Delta z + 2a_{23}\Delta y \Delta z \leq 16$$

The quadratic form corresponding to $C_2$ is expanded and computed as efficiently as possible within nested loops for the grid variables x, y. The inner loop for z is replaced by solving a quadratic equation. The limits for x and the corresponding index are shown in Eqs. 29-30:

$$-4\alpha \leq x \leq +4\alpha \qquad \text{Eq. 29}$$

$$i x \max = (4\alpha/sx) = N \qquad \text{Eq. 30}$$

Begin a loop for x and compute terms, which depend on x alone as shown by Eqs. 31-36:

$$\text{for } ix = -ix\max : +ix\max \qquad \text{Eq. 31}$$

$$x = ix * sx \qquad \text{Eq. 32}$$

$$dx = \Delta x = x - x_2 \qquad \text{Eq. 33}$$

$$dx2 = a_{11}\Delta x^2 \qquad \text{Eq. 34}$$

$$dxa12 = 2a_{12}\Delta x \qquad \text{Eq. 35}$$

$$dxa13 = 2a_{13}\Delta x \qquad \text{Eq. 36}$$

The limits for y and the corresponding index are shown by Eqs. 37-40:

$$s^2 = 16 - x^2/\alpha^2 \qquad \text{Eq. 37}$$

$$s^2 - y^2/\beta^2 \geq 0 \qquad \text{Eq. 38}$$

$$-s\beta \leq y \leq +s\beta \qquad \text{Eq. 39}$$

$$y\max = \text{round}(s*\beta/sy) \qquad \text{Eq. 40}$$

In an embodiment, a fast algorithm for computing the ellipsoid intersection volume can be used. In the fast algorithm, a lower bound for the quadratic form corresponding to $C_2$ is compared to the threshold of 16 for containment in the corresponding ellipsoid. If this test fails, then no further processing is required for this value of x. Since the loop for x contains the loops for y and z, this eliminates a significant number of computations. In contrast, a general purpose 3D quadrature algorithm must evaluate the quadratic forms at all quadrature points within a 3D rectangle containing the ellipsoid with smallest volume. Further, a lower bound for the quadratic form corresponding to $C_2$ is obtained as shown in Eqs. 41-43:

$$dy\max = \max(|s\beta + y_2|, |s\beta - y_2|) \qquad \text{Eq. 41}$$

$$dz\max = \max(|s\gamma + z_2|, |s\gamma - z_2|) \qquad \text{Eq. 42}$$

$$LB = dx2 - |dxa12|*dy\max - |dxa13|*dz\max - 2|a_{23}|*dy\max*dz\max \qquad \text{Eq. 43}$$

This is a coarse lower bound, which is not attained. The precise minimum of a quadratic form is easy to obtain, but the additional computations increase the execution time. A similar lower bound for the quadratic form corresponding to $C_2$ is utilized within the loop for y. The inner loop for z is replaced by solving a quadratic equation in $\Delta z$. The coefficients are shown in Eqs. 44-46:

$$b_2 = a_{33} > 0 \text{ since } A \text{ is positive definite} \qquad \text{Eq. 44}$$

$$b_1 = 2a_{13}\Delta x + 2a_{23}\Delta y = dxa13 + dya23 \qquad \text{Eq. 45}$$

$$b_0 = a_{11}\Delta x^2 + a_{22}\Delta^2 + 2a_{12}\Delta x \Delta y - 16 = dx2 + dy2 + dxdy - 16 \qquad \text{Eq. 46}$$

The discriminant is shown in Eq. 47:

$$D = b_1^2 - 4b_2 b_0 \qquad \text{Eq. 47}$$

If $D \geq 0$, then the ellipsoids may intersect for the fixed values of x, y and the interval of z contained in the intersection is obtained as follows. The interval of z contained in the ellipsoid corresponding to $C_1$ is shown in Eqs. 48-49:

$$z\max = \gamma\sqrt{s^2 - y^2\beta^2} \qquad \text{Eq. 48}$$

$$-z\max \leq z \leq +z\max \qquad \text{Eq. 49}$$

The interval of z contained in the ellipsoid corresponding to $C_2$ is shown in Eqs. 50-51:

$$zl2 = z_2 + (-b_1 - \sqrt{D})/(2b_2) \qquad \text{Eq. 50}$$

$$zu2 = z_2 + (-b_1 + \sqrt{D})/(2b_2) \qquad \text{Eq. 51}$$

Since $b_2 > 0$, the quadratic form is concave up and the interval $zl2 \leq z \leq zu2$ is contained in the ellipsoid corresponding to $C_2$. The intersection of the two intervals for z has endpoints as shown in Eqs. 51-52:

$$zl = \max(-z\max, zl2) \qquad \text{Eq. 51}$$

$$zu = \min(+z\max, zu2) \qquad \text{Eq. 52}$$

If $zl \leq zu$, then increment the volume of the intersection as shown in Eq. 53:

$$vol3 = vol3 + sx*sy*(zu-zl) \qquad \text{Eq. 53}$$

The fast algorithm is compared to a related numerical method. In the related numerical method, the volume of the intersection of two error ellipsoids $E_1$ and $E_2$ may be computed by numerical approximation of the integral as shown in Eq. 54:

$$V_3 = \int\int_R\int f(x, y, z) \qquad \text{Eq. 54}$$

In this equation, R is a rectangular region containing $E_1$ and the integrand f returns the value 1 on $E_1 \cap E_2$ or the value 0 otherwise. The integrand f utilizes Mahalanobis distance for each error ellipsoid with a threshold of 16, which is equivalent to scaling the error ellipsoids to four standard deviations. Unfortunately, numerical approximation of this integral in three dimensions is extremely time-consuming.

Figure 10:
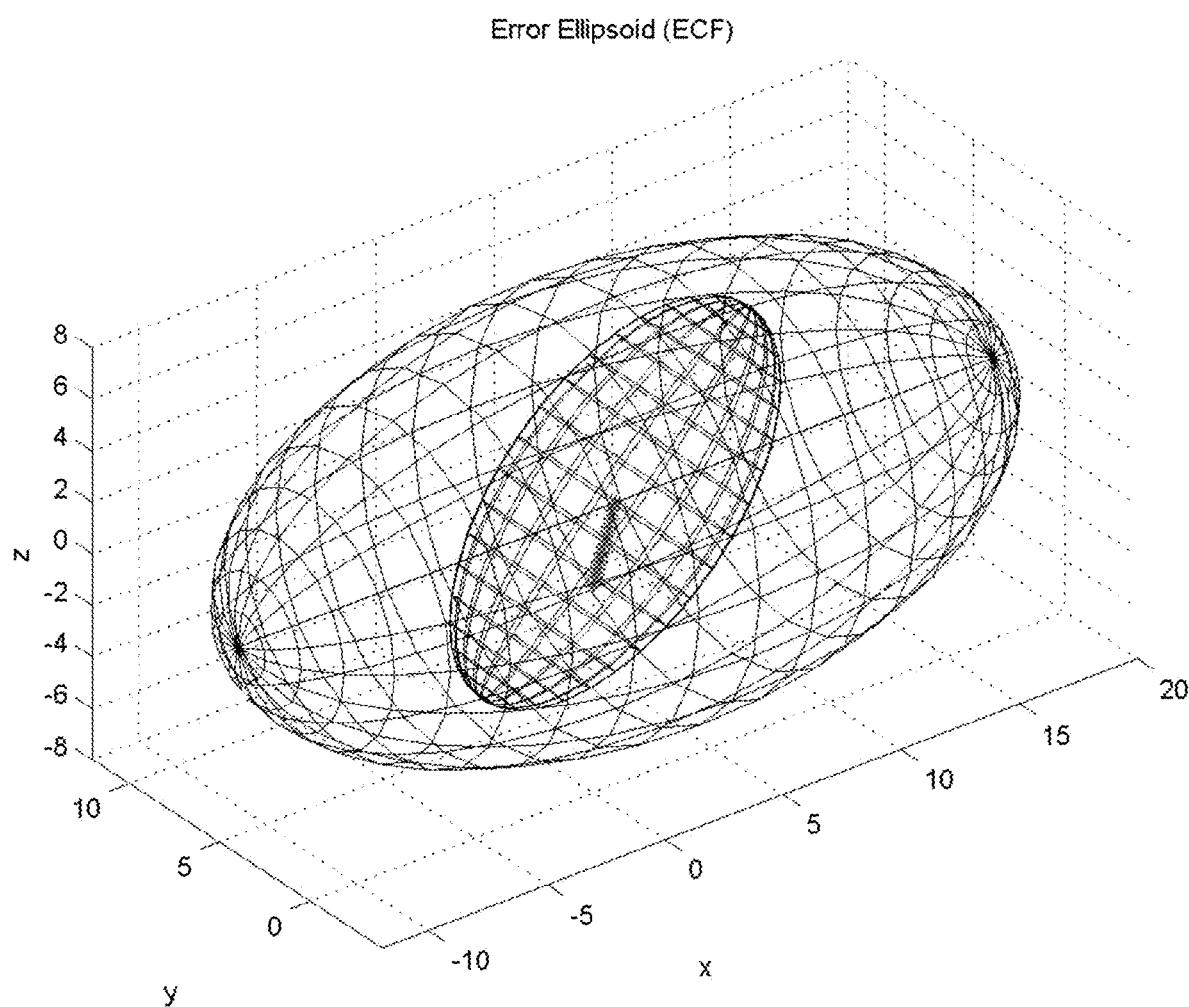
FIG. 10 shows a plot of ellipsoid intersection volume test 1.

The ellipsoid intersection volume algorithms (the fast algorithm and the related numerical method) are tested with three cases. The ellipsoids for Test 1 are plotted in FIG. 10. The ellipsoid corresponding to $C_1$ is fully contained in the ellipsoid corresponding to $C_2$, and the ratio of corresponding axes is 2. From the definitions of the ellipsoid intersection ratios $R_1, R_2$, it is easy to verify the true values in Table 5. The ellipsoid intersection ratios $R_1, R_2$ were estimated by two algorithms: the triple quadrature function from MATLAB and the fast algorithm. The computations were repeated 100 times in order to obtain the mean execution time. The results in Table 5 show that the fast algorithm obtains correct results with a significant reduction of execution time.

TABLE 5

Ellipsoid Intersection Volume Test 1 Results

|  | R1 | R2 | Mean Time (s) |
| --- | --- | --- | --- |
| True | 1.0000 | 0.1250 | NA |
| Triple Quad | 1.0030 | 0.1254 | 2.5576 |
| Fast | 1.0000 | 0.1250 | 0.0106 |

Figure 11:
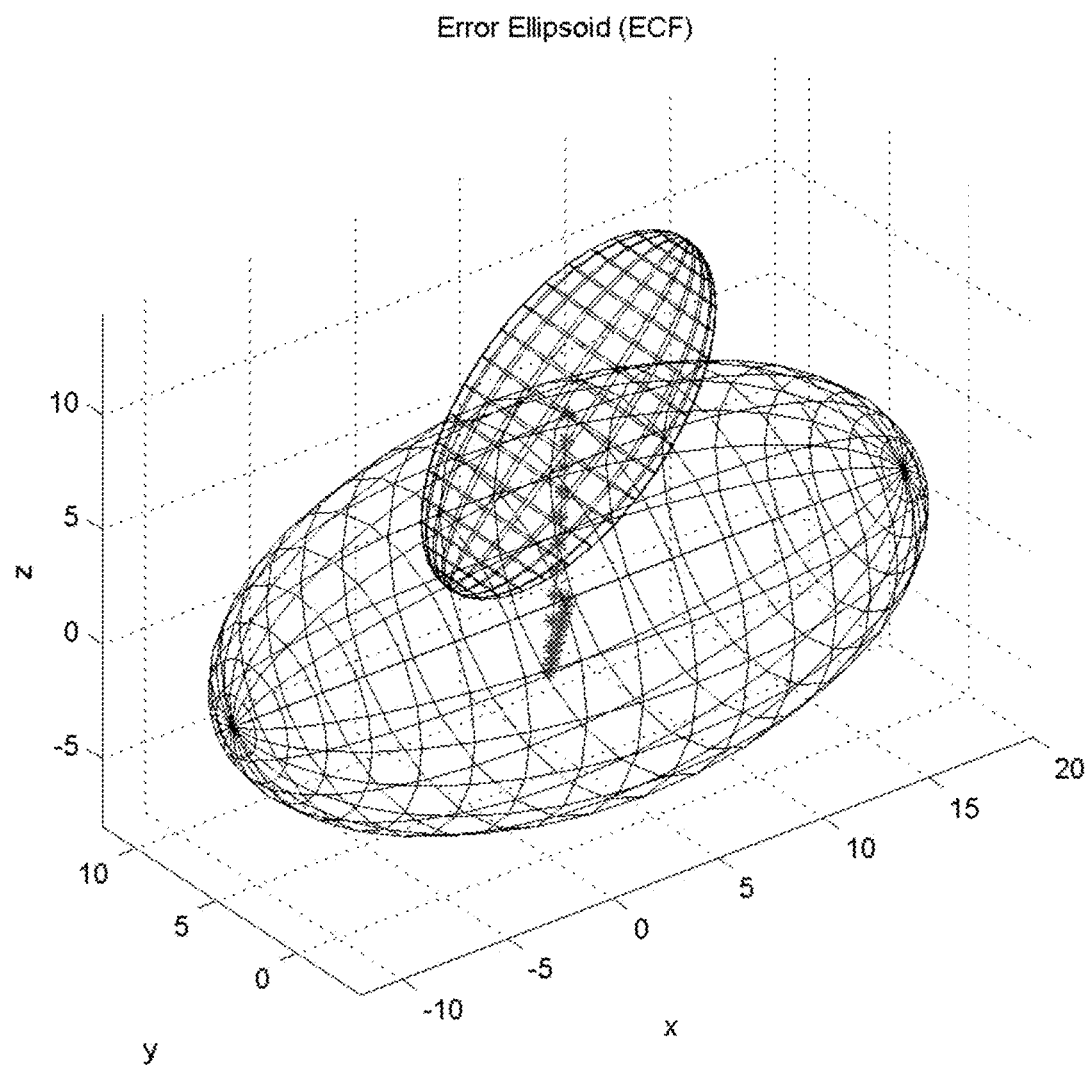
FIG. 11 shows a plot of ellipsoid intersection volume test 2.
Figure 12:
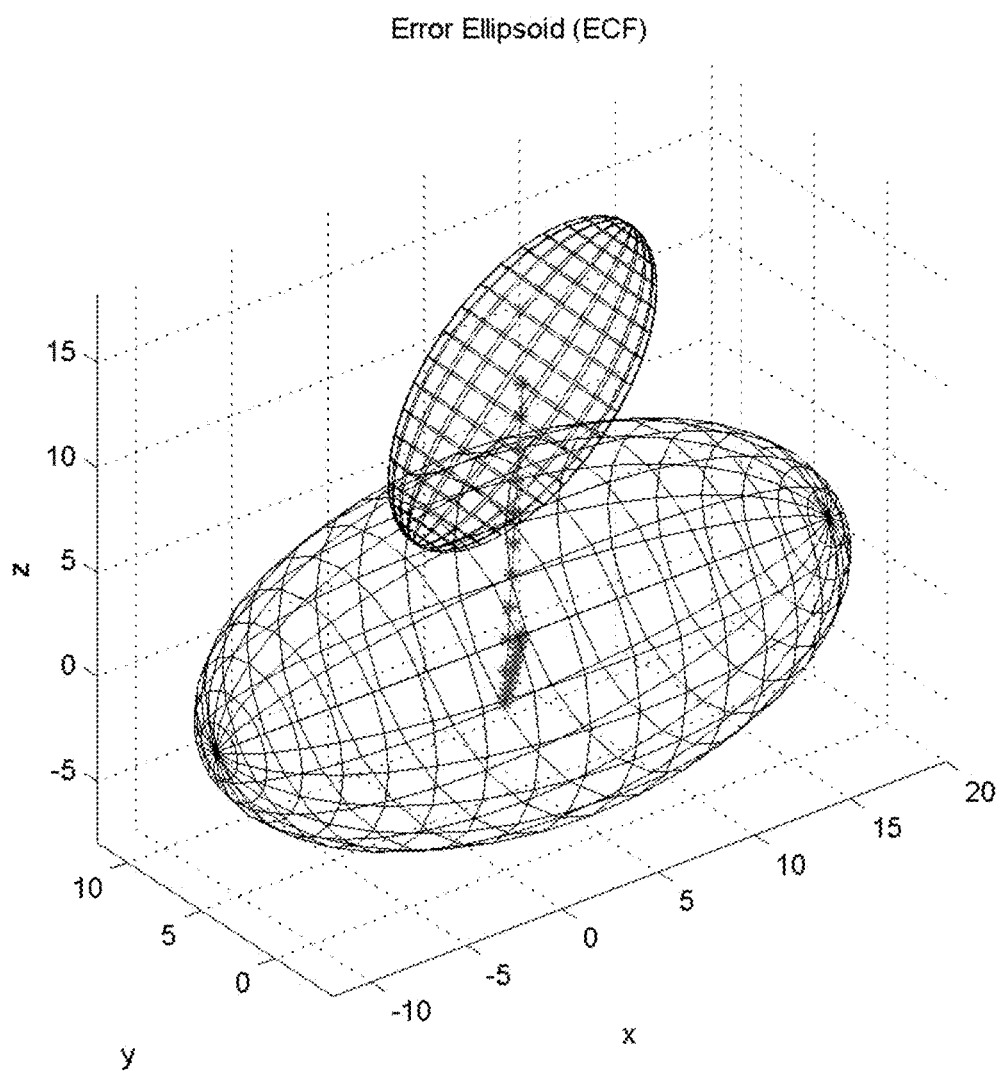
FIG. 12 shows a plot of ellipsoid intersection volume test 3.

The ellipsoids for Tests 2-3 are plotted in FIG. 11 and FIG. 12. The ellipsoid corresponding to $C_1$ is partially contained in the ellipsoid corresponding to $C_2$, and the ratio of corresponding axes is 2. State estimate $P_1$ (plotted in red) is selected such that the ratio of containment $R_1$ is decreasing. The results in Table 6 and Table 7 show that the fast algorithm obtains the same results with a significant reduction of execution time.

TABLE 6

Ellipsoid Intersection Volume Test 2 Results

|  | R1 | R2 | Mean Time (s) |
| --- | --- | --- | --- |
| Triple Quad | 0.4585 | 0.0573 | 1.6882 |
| Fast | 0.4573 | 0.0572 | 0.0065 |

TABLE 7

Ellipsoid Intersection Volume Test 3 Results

|  | R1 | R2 | Mean Time (s) |
| --- | --- | --- | --- |
| Triple Quad | 0.0699 | 0.0087 | 0.4407 |
| Fast | 0.0695 | 0.0087 | 0.0066 |

According to an aspect of the disclosure, the two thresholds $T_1$ and $T_2$ for the ellipsoid intersection ratio thresholds can be obtained by training the fusion selection algorithm utilizing simulated track reports for the sensors.

Figure 4:
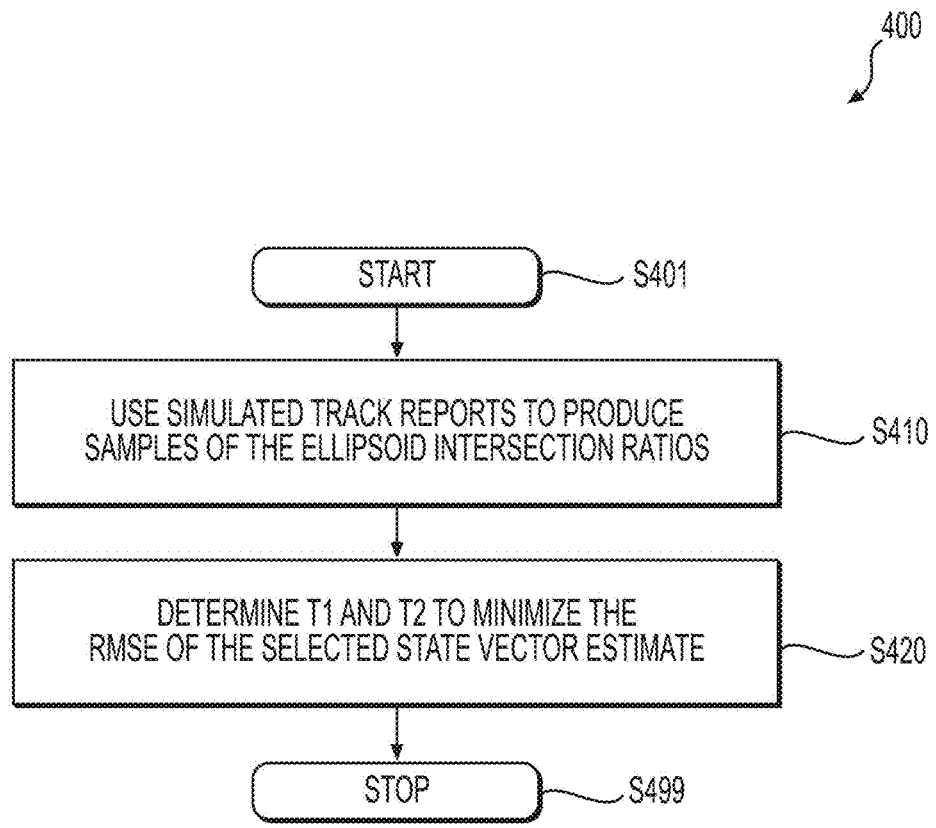
FIG. 4 shows a flow chart outlining a process 400 for determining ellipsoid intersection ratio thresholds according to an embodiment of the disclosure.

FIG. 4 shows a flow chart outlining a process 400 for determining the thresholds for the ellipsoid intersection ratios according to an embodiment of the disclosure. In an example, the process 400 is executed by the computing device 110. It is noted that the process 400 can be executed by another computing device that is similarly configured as the computing device 110. The process starts at S401 and proceeds to S410.

At S410, simulated track reports are used to produce samples of the ellipsoid intersection ratios $R_1$ and $R_2$. An example of software instructions for S410 is shown in Appendix A.

In the Appendix A example, two covariance matrices $C_1$ and $C_2$ may be scaled to model inconsistency for five cases. In case 1, fused estimate is dominated by a first sensor (Sensor 1). In case 1, a random scale factor in the interval [0.5, 1.0] is used for $C_1$, and a random scale factor in the interval [1.0, 10.0] is used for $C_2$.

In case 2, consistent covariance matrices are used with no scaling.

In case 3, fused estimate is dominated by a second sensor (Sensor 2). In the third case, a random scale factor in the interval [1.0, 2.0] is used for $C_1$ and a random scale factor in the interval [0.1, 1.0] is used for $C_2$.

In case 4, a random scale factor in the interval [0.1, 10.0] is used for $C_2$. The fourth case is a composition of cases 1-3.

In case 5, covariance $C_2$ changes dynamically from consistent with no scaling to a random scale factor in the interval [0.1, 1.0].

Covariance matrices $C_1$ and $C_2$ can be representative of the error characteristics of Sensor 1 and Sensor 2 respectively. The error ellipsoid axes (standard deviations) are selected randomly, but constrained by relationships between the axes. For example, Sensor 1 is representative of a radar, and the range axis is significantly smaller than the cross-range axes. Examples of the error ellipsoid axes are presented in Table 3. The spatial orientation (roll, pitch, yaw) of the error ellipsoid axes are selected randomly. After the random selection of the error ellipsoid axes and the spatial orientation, the covariance matrices are fixed for Monte Carlo trials.

Further, the Appendix A example includes loop for Monte Carlo trials. The loop includes four portions.

The first portion is for state vector and covariance matrix scaling. In an example, for convenience, the true state vector is zero and the estimated state vector is a Gaussian random vector with zero mean and covariance matrix corresponding to $C_1$ and $C_2$. After the random selection of the state vectors, the covariance matrices $C_1$ and $C_2$ are scaled randomly according to the covariance consistency cases described above.

The second portion is for fused state and covariance. In an example, the minimum variance unbiased (MVU) estimator is computed, as presented in Eq 4.

The third portion is for computing ellipsoid intersection ratios, such as discussed with reference to FIG. 2 and FIG. 3.

The fourth portion is for assessing true benefit of fusion. In an example, the squared error magnitude is computed for Sensor 1, Sensor 2 and the fused estimate. The minimum of these is referred to as the ideal squared error and it is used to assess the true benefit of fusion.

The above operations can be executed multiple times for each of the cases 1-3. In an example, the operations described in this section is executed 9 times for all combinations of Sensors 1-2 in covariance consistency cases 1-3, such that 9 sets of the data are produced. The ellipsoid intersection ratios are saved, and error statistics to assess the true benefit of fusion are saved as well.

At S420, the thresholds to minimize the RMSE of the selected state vector estimate are determined. An example of software instructions for S420 is shown in Appendix B.

In the Appendix B example, ellipsoid intersection ratio thresholds ($T_1$ and $T_2$) are computed for the following cases: Sensor 1 in case 1, Sensor 2 in case 4; Sensor 1 in case 2, Sensor 2 in case 4; and Sensor 1 in case 3, Sensor 2 in case 4.

The Appendix B example includes codes to load ellipsoid intersection ratios. In an example, there are 9 sets of this data produced in S410, corresponding to all combinations of Sensors 1-2 in covariance consistency cases 1-3. The ellipsoid intersection ratios are loaded. The error statistics to assess the true benefit of fusion are loaded as well.

Further, the Appendix B example includes codes for computing covariance matrices for the same 5 cases in Appendix A.

Then, the Appendix B example includes a code portion of loop for ratio percentile. This loop can obtain the ellipsoid intersection ratio thresholds, which minimize the RMSE of the selected estimator (Sensor 1 or fused). In the example, the index of this loop is p and it varies from 0 to 15 in increments of 5.

For each occurrence of the loop for ratio percentile, thresholds for ellipsoid intersection ratios are computed. In an example, the ellipsoid intersection ratios from the Monte Carlo trials with a benefit from fusion (minimum error is the fused error) are selected. Threshold $T_2$ is the p percentile of the selected $R_2$ values. In an example, a relatively small percentile is utilized rather than the minimum. Threshold $T_1$ is the 99-p percentile of the selected $R_1$ values. In an example, a relatively large percentile is utilized rather than the maximum. In an example, utilization of percentiles rather than min/max values enables a search for thresholds $T_1$ and $T_2$, which minimize the RMSE of the selected estimator (Sensor 1 or fused). In an example, thresholds $T_1$ and $T_2$ are computed for 3 sets of data produced by S410, corresponding to Sensor 2 in covariance consistency cases 1-3.

Then, the occurrence of the loop for ratio percentile includes loop for Monte Carlo trials. The loop for Monte Carlo trial includes 5 portions.

The first portion is for state vector and covariance matrix scaling. In an example, for convenience, the true state vector is zero and the estimated state vector is a Gaussian random vector with zero mean and covariance matrix corresponding to $C_1$ and $C_2$. After the random selection of the state vectors, the covariance matrices $C_1$ and $C_2$ are scaled randomly according to the covariance consistency cases described above.

The second portion is for fused state and covariance. In an example, the minimum variance unbiased (MVU) estimator is computed, as presented in Eq 4.

The third portion is for computing ellipsoid intersection ratios, such as discussed with reference to FIG. 2 and FIG. 3.

The fourth portion is for assessing true benefit of fusion. In an example, the squared error magnitude is computed for Sensor 1, Sensor 2 and the fused estimate. The minimum of these is referred to as the ideal squared error and is used to assess the true benefit of fusion.

The fifth portion is for predicted benefit of fusion. Thresholds $T_1$ and $T_2$ can be computed for 3 sets of data produced in S410, corresponding to Sensor 2 in covariance consistency cases 1-3. Since Sensor 2 is in case 4, which is the composition of cases 1-3, the thresholds $T_1$ and $T_2$ for the cases 1-3 may be utilized. In an example, the fusion selection algorithm is applied utilizing thresholds $T_1$ and $T_2$ for cases 1-2 in that order. If the fused estimator is not selected utilizing thresholds for cases 1-2, then the Sensor 1 estimator is selected. Thresholds $T_1$ and $T_2$ are largest for case 1, and decrease for cases 2-3. This is the reason for applying thresholds $T_1$ and $T_2$ in the order of case numbers. However, threshold $T_2$ for case 3 may be low and degrades the RMSE of the selected estimator (Sensor 1 or fused). Consequently, thresholds $T_1$ and $T_2$ for case 3 are not utilized.

Further, the occurrence of the loop for ratio percentile includes codes for state vector error metrics. In addition to the RMSE, there is a concern that fusion may result in an increase in the maximum error magnitude. However, the maximum error magnitude may represent a single wild point. Consequently, the 90% of the error magnitude is utilized as a metric. More precisely, the R90SE is defined as the square root of the 90% of the squared error magnitude. The RMSE and R90SE metrics are computed for the following estimators: Sensor 1, Sensor 2, fused, selected and ideal (minimum).

Further, the occurrence of the loop for ratio percentile includes codes for benefit frequency and delta matrices.

Further, the occurrence of the loop for ratio percentile includes codes for test for minimum RMSE metric. In an example, the objective of the loop for ratio percentile p is to obtain the ellipsoid intersection ratio thresholds, which minimize the RMSE of the selected estimator (Sensor 1 or fused). The thresholds $T_1$ and $T_2$ for each of Cases 1-3 and the corresponding ratio percentile p are identified.

Further, the Appendix B example saves thresholds for ellipsoid intersection ratios. In an example, the operations in S420 are executed 3 times for Sensor 1 in covariance consistency Cases 1-3 and Sensor 2 in Case 4. The corresponding ratio percentile p is saved as well.

Then, the process proceeds to S499 and terminates.

Figure 5:
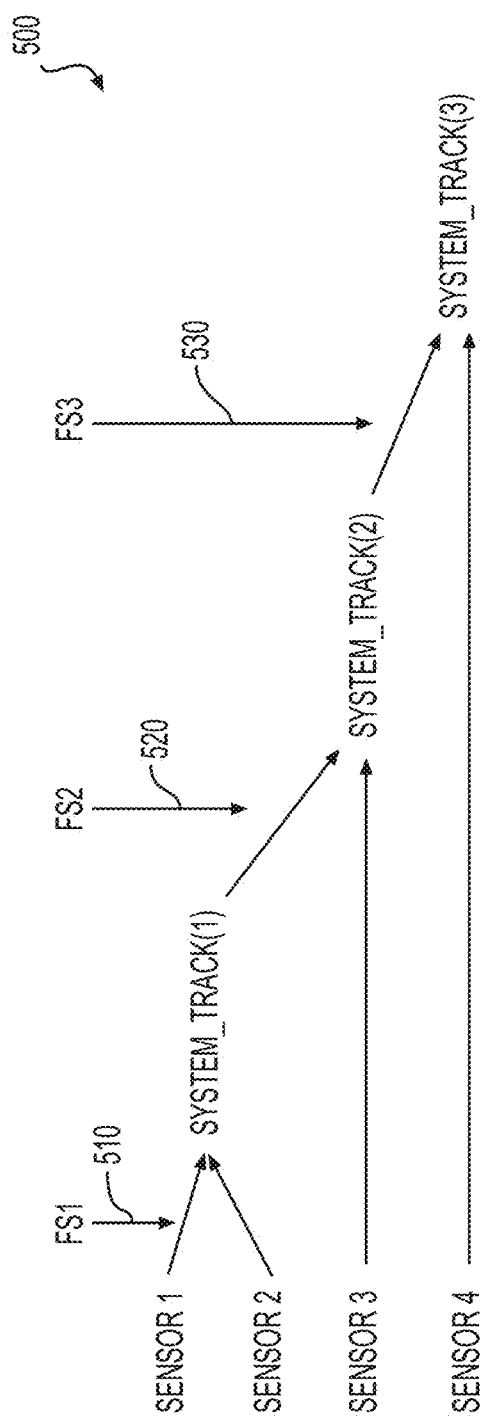
FIG. 5 shows a diagram 500 illustrating recursive fusion selection according to an embodiment of the disclosure.

FIG. 5 shows a diagram 500 illustrating recursive fusion selection according to an embodiment of the disclosure. In the FIG. 5 example, track reports of four sensors (sensor 1, sensor 2, sensor 3 and sensor 4) are received, and the fusion selection algorithm can be executed three times to generate a final system track for the four sensors. For example, in a first application, as shown by 510, of the fusion selection algorithm, track reports of sensor 1 and sensor 2 are used to generate a first system track as shown by system_track(1). Further, in a second application, as shown by 520, of the fusion selection algorithm, track reports of the first system track and sensor 3 are used to generate a second system track as shown by system_track(2). In a third application, as shown by 530, of the fusion selection algorithm, track reports of the second system track and sensor 4 are used to generate a third system track as shown by system_track(3). The third system track is the final system track for the four sensors.

It is noted that the example in FIG. 5 can be suitably adjusted for any suitable number of sensors.

In an implementation example according to present disclosure, the Monte Carlo study is used and the results are summarized by the metrics in Table 8 (shown in FIG. 22) and Table 9 (shown in FIG. 23). Each row corresponds to a combination of covariance consistency cases for two sensors, and is identified by a two digit case number. The first digit is used to identify a case for Sensor 1 and the second digit is used to identify a case for Sensor 2. Covariance matrices $C_1, C_2$ may be scaled to model inconsistency as defined for the five cases.

In case 1, fused estimate is dominated by Sensor 1. Random scale factor for $C_1$ is in the interval [0.5, 1.0]. Random scale factor for $C_2$ is in the interval [1.0, 10.0].

In case 2, consistent covariance matrices with no scaling.

In case 3, fused estimate is dominated by Sensor 2. Random scale factor for $C_1$ is in the interval [1.0, 2.0]. Random scale factor for $C_2$ is in the interval [0.1, 1.0].

In case 4, random scale factor for $C_2$ is in the interval [0.1, 10.0]. This is a composition of Cases 1-3.

In case 5, covariance $C_2$ changes dynamically from consistent with no scaling to a random scale factor in the interval [0.1, 1.0].

For example, Case 24 means that Sensor 1 is in case 2 and Sensor 2 is in case 4.

The fusion performance metric is the Root Mean Square Error (RMSE) as shown by Eq. 55:

$$\text{RMSE} = (1/N \Sigma_{i=1}^{N} |\hat{x}_i|^2)^{1/2} \qquad \text{Eq. 55}$$

In addition to the RMSE, there is a concern that fusion may result in an increase in the maximum error magnitude. However, the maximum error magnitude may represent a single wild point. Consequently, the 90% of the error magnitude is utilized as a metric. More precisely, the R90SE is defined as the square root of the 90% of the squared error magnitude. The RMSE and R90SE metrics are computed for the following estimators: Sensor 1, Sensor 2, fused, selected and ideal (minimum). The ideal state vector errors are not attainable because the true state vector is utilized to select the estimator with the minimum error. In some cases, Sensor 2 produces the estimate with the minimum error. In an example, the Fusion Selection Algorithm (FSA) does not select the Sensor 2 estimate because this does not minimize the RMSE metric. Although the ideal RMSE is not attainable, it is very useful for normalizing the RMSE by dividing it by the ideal value. Perfect performance of the FSA is represented by a normalized RMSE value of 1.0. Similarly, the R90SE metric is normalized by the ideal value.

The normalized RMSE and R90SE metrics for each estimator are shown in Table 8 (FIG. 22) and Table 9 (FIG. 23) and are color coded in ascending order: blue, green, yellow and red. The averages of these metrics for all cases are presented in the final row of each table. A common practice is to select the Sensor 1 estimator rather than the fused estimator. Consequently, it is natural to utilize the Sensor 1 normalized RMSE as a baseline for comparison to the FSA normalized RMSE. For the average over all cases, the normalized RMSE is reduced by 5.6%. Of particular interest is Case 22, meaning that $C_1, C_2$ are both consistent. For this case, the normalized RMSE is reduced by 15.5%. Similar reductions are achieved for the normalized R90SE metric. These results correspond to the position error ellipsoid axes in Table 3 and results may vary. Consequently, these parameters can be selected to represent the sensors before application of the Fusion Selection Training Algorithm.

According to results for ellipsoid intersection ratio thresholds, $T_1, T_2$ have been computed for 3 sets of data corresponding to Sensor 2 in covariance consistency Cases 1-3. Since Sensor 2 may be in case 4, which is the composition of Cases 1-3, the thresholds $T_1, T_2$ for all 3 cases may be utilized. The FSA is applied utilizing thresholds $T_1, T_2$ for Cases 1-2 in that order. If the fused estimator is not selected utilizing thresholds for Cases 1-2, then the Sensor 1 estimator is selected. Thresholds $T_1, T_2$ are largest for Case 1, and decrease for Cases 2-3. This is the reason for applying thresholds $T_1, T_2$ in the order of case numbers. However, threshold $T_2$ for Case 3 may be low and it degrades the RMSE of the selected estimator (Sensor 1 or fused). Consequently, thresholds $T_1, T_2$ for Case 3 are not utilized. Results for thresholds $T_1, T_2$ are presented in Table 10.

TABLE 10

Ellipsoid Intersection Ratio Thresholds

| | Case 21 | Case 22 | Case 23 |
|---|---|---|---|
| T1 | 0.9943 | 0.6634 | 0.6055 |
| T2 | 0.9515 | 0.8256 | 0.3401 |

Figure 13:
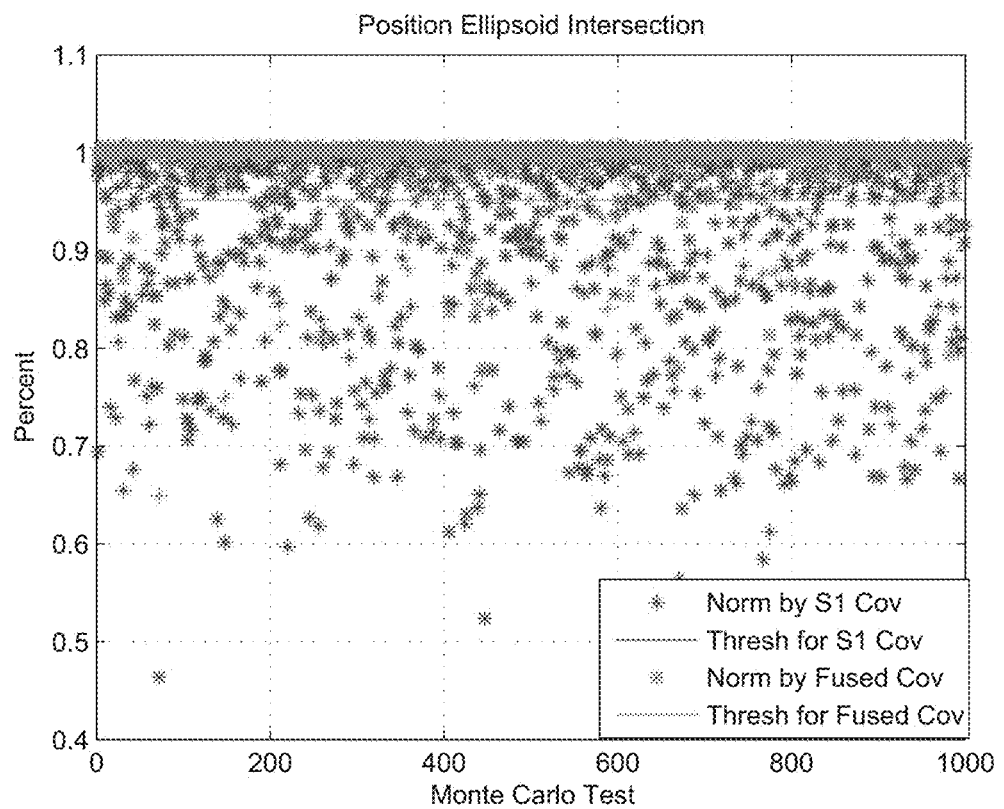
FIG. 13 shows a plot of ellipsoid intersection ratios for case 21.

The ellipsoid intersection ratios for Case 21 are plotted in FIG. 13 including the corresponding thresholds $T_1, T_2$ from Table 10. Threshold $T_1$ is not visible because of the cluster of data points near the same value. For Case 21, Sensor 1 is in case 2 (consistent) and Sensor 2 is in case 1 (random scale factor for $C_2$ is in the interval [1.0, 10.0]). In this case, the fused estimator is dominated by Sensor 1 and ratio $R_2$ is almost always greater than the corresponding threshold $T_2$. Since threshold $T_1$ is utilized as an upper bound, there is essentially no constraint on the corresponding ratio $R_1$. Consequently, the FSA selects the fused estimator.

Figure 14:
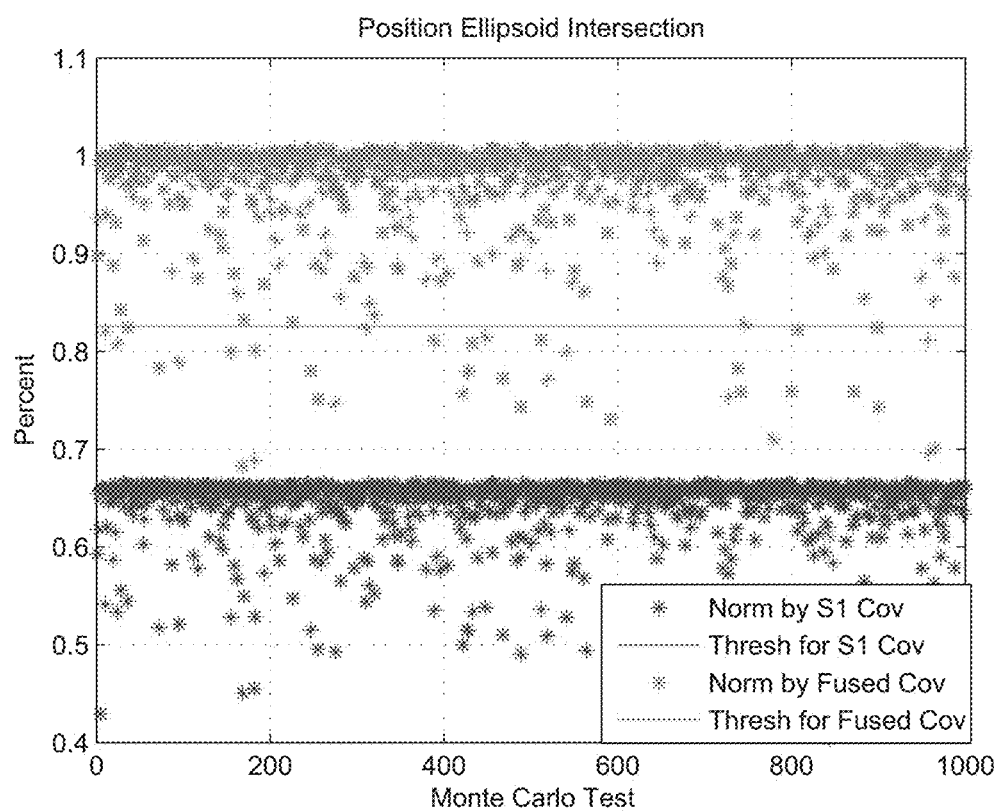
FIG. 14 shows a plot of ellipsoid intersection ratios for case 22.

The ellipsoid intersection ratios for Case 22 are plotted in FIG. 14, including the corresponding thresholds $T_1, T_2$ from Table 10. Threshold $T_1$ is not visible because of the cluster of data points near the same value. For Case 22, Sensor 1 is in case 2 (consistent) and Sensor 2 is in case 2 (consistent). In this case, the fused estimator attains the minimum RMSE. In examples, Ratio $R_2$ is greater than the corresponding threshold $T_2$ and ratio $R_1$ is less than the corresponding threshold $T_1$. Consequently, the FSA selects the fused estimator.

Figure 15:
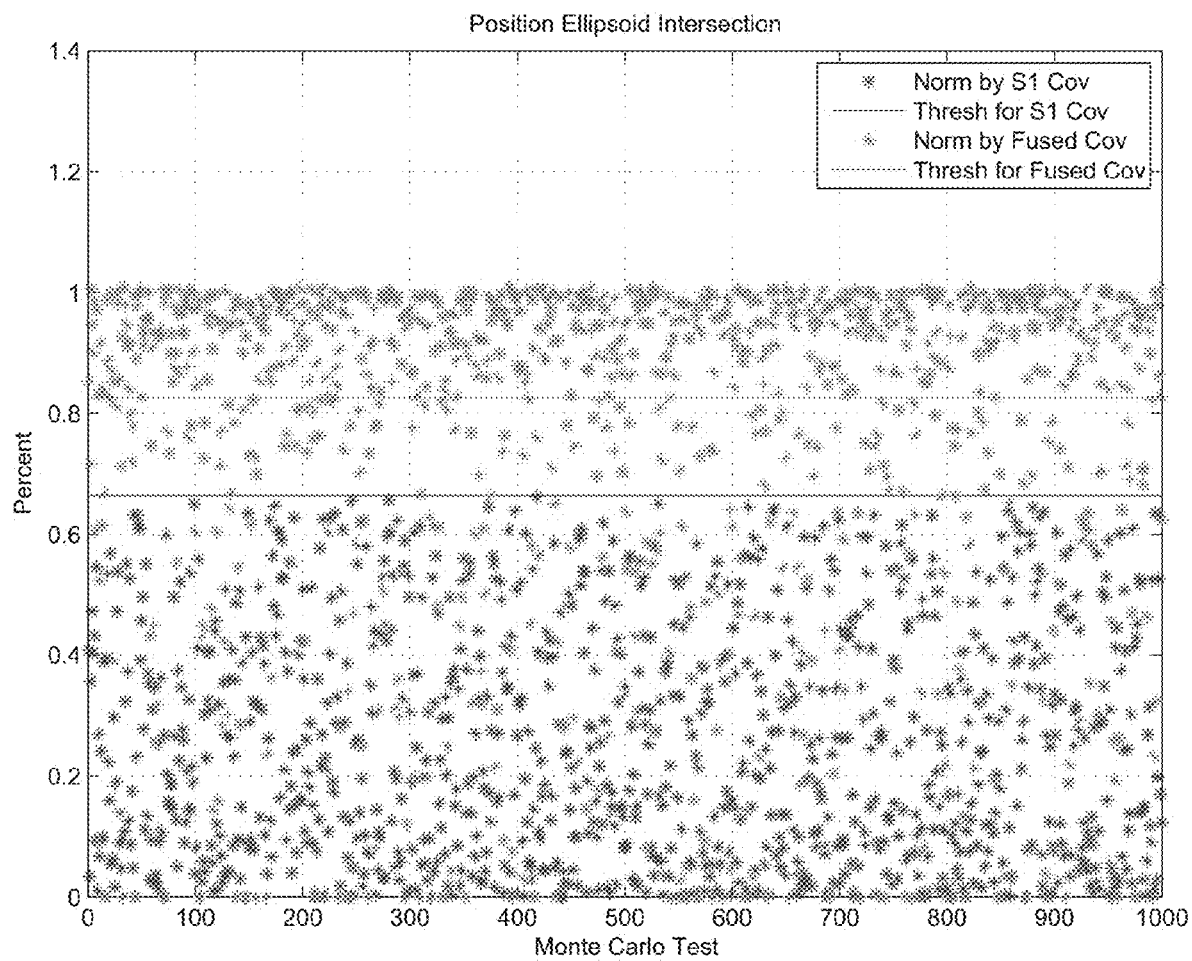
FIG. 15 shows a plot of ellipsoid intersection ratios for case 23.

The ellipsoid intersection ratios for Case 23 are plotted in FIG. 15 including the thresholds $T_1, T_2$ for Case 22 from Table 10. For Case 23, Sensor 1 is in case 2 (consistent) and Sensor 2 is in case 3 (random scale factor for $C_2$ is in the interval [0.1, 1.0]). In this case, the fused estimator is dominated by Sensor 2 and the results are less predictable than the previous cases. Ratio $R_2$ is distributed throughout the interval [0, 1] and may be greater or less then the corresponding threshold $T_2$. Since threshold $T_1$ is utilized as an upper bound, there is no constraint on the corresponding ratio $R_1$. Consequently, the FSA may select either the Sensor 1 or fused estimator, depending on the value of ratio $R_2$.

Figure 16:
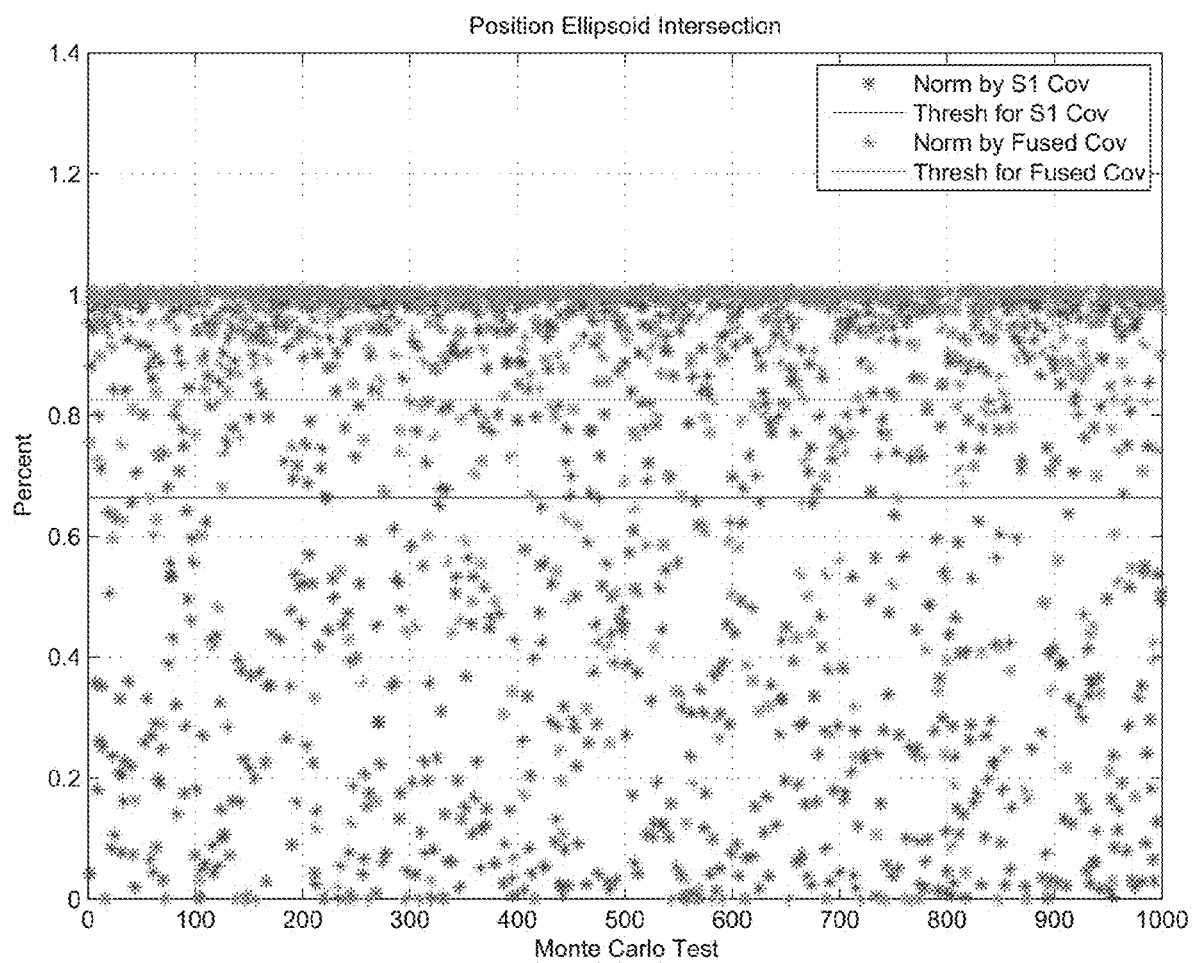
FIG. 16 shows a plot of ellipsoid intersection ratios for case 24.

According to results for composition of covariance consistency cases, the ellipsoid intersection ratios for Case 24 are plotted in FIG. 16, including the thresholds $T_1, T_2$ for Case 22 from Table 10. For Case 24, Sensor 1 is in case 2 (consistent) and Sensor 2 is in case 4 (random scale factor for $C_2$ is in the interval [0.1, 10.0]). In this case, the fused estimator may be dominated by Sensor 1 or Sensor 2 and the results are less predictable than the previous cases. Ratios $R_1, R_2$ are distributed throughout the interval [0, 1] and may be greater or less then the corresponding thresholds $T_1, T_2$. Consequently, the FSA may select either the Sensor 1 or fused estimator, depending on the values of ratios $R_1, R_2$.

In the results for composition of covariance consistency cases, thresholds $T_1, T_2$ have been computed for 3 sets of data, corresponding to Sensor 2 in covariance consistency Cases 1-3. Since Sensor 2 is in case 4, which is the composition of Cases 1-3, the thresholds $T_1, T_2$ for all 3 cases may be utilized. The FSA is applied utilizing thresholds $T_1, T_2$ for Cases 1-2 in that order. If the fused estimator is not selected utilizing thresholds for Cases 1-2, then the Sensor 1 estimator is selected. Thresholds $T_1, T_2$ are largest for Case 1, and decrease for Cases 2-3. This is the reason for applying thresholds $T_1, T_2$ in the order of case numbers. However, threshold $T_2$ for Case 3 may be low and it degrades the RMSE of the selected estimator (Sensor 1 or fused). Consequently, thresholds $T_1, T_2$ for Case 3 are not utilized.

Figure 17:
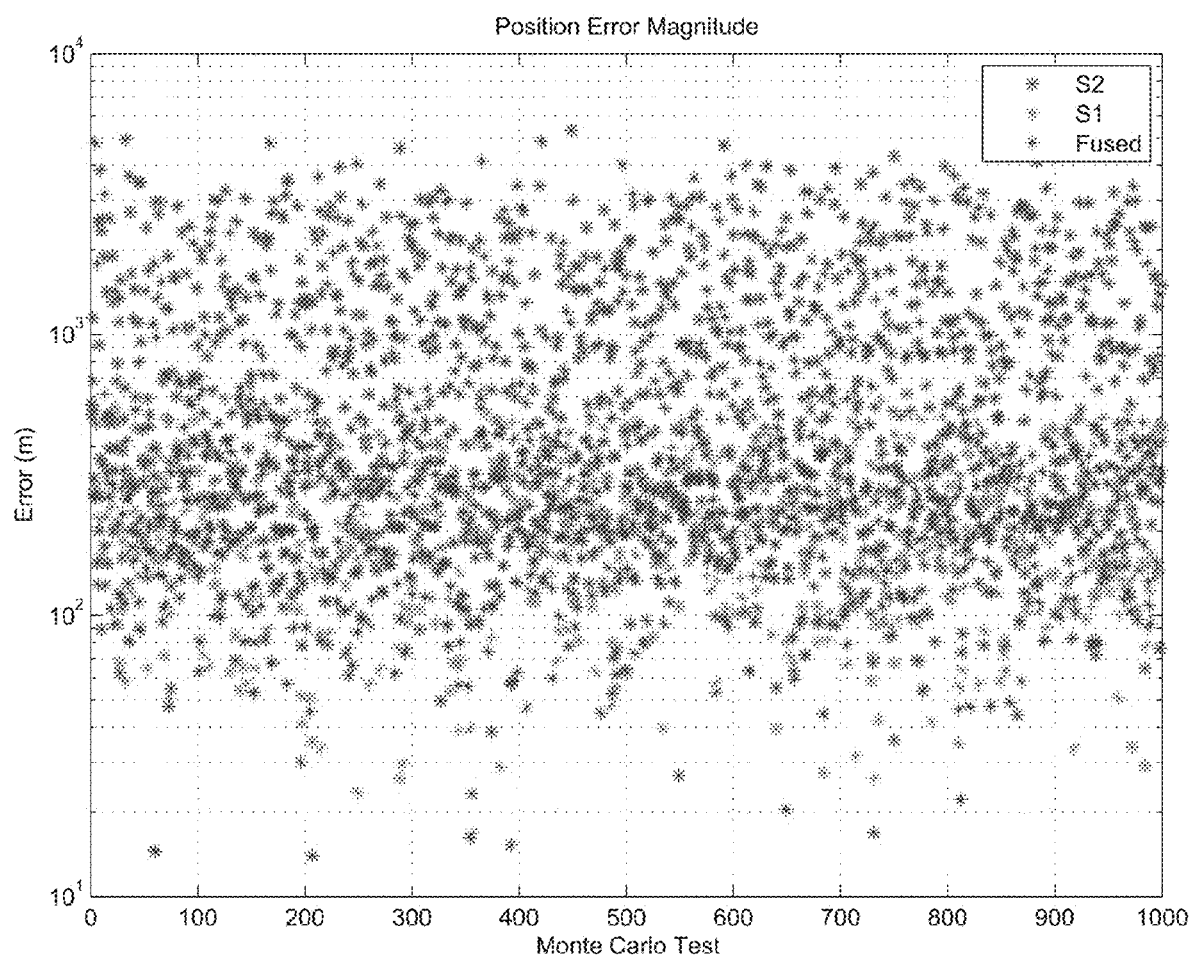
FIG. 17 shows a plot of fused position error magnitude for case 24.
Figure 18:
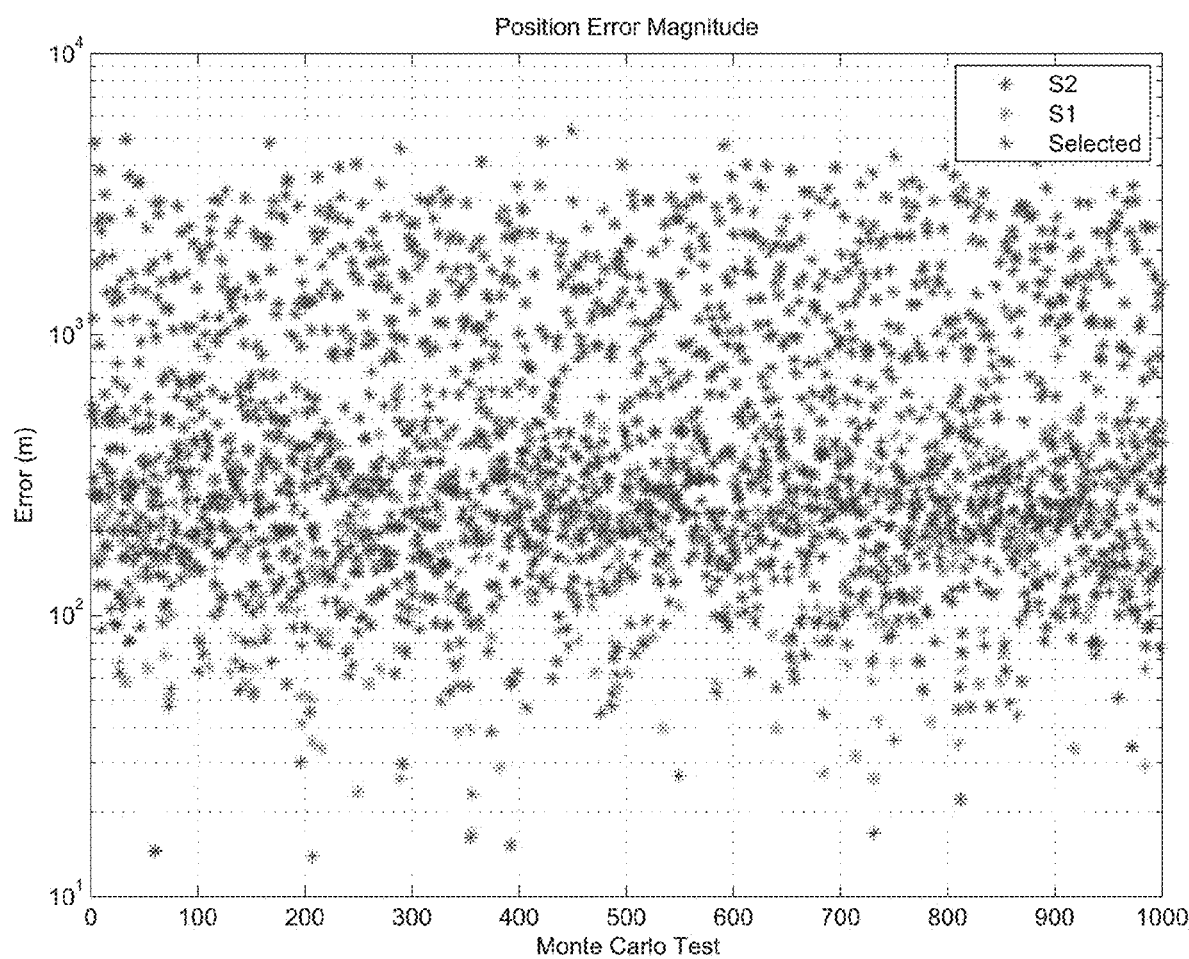
FIG. 18 shows a plot of selected position error magnitude for case 24.

The position error magnitudes for Sensor 1, Sensor 2 and the fused estimator for Case 24 are plotted in FIG. 17. Note the large errors for the fused estimator, which occur when the scale factor for $C_2$ is close to the minimum value. The position error magnitudes for Sensor 1, Sensor 2 and the selected estimator for Case 24 are plotted in FIG. 18. The large errors for the fused estimator have been eliminated because the FSA selected the Sensor 1 state vector for those Monte Carlo tests.

The metrics provide a summary of the FSA performance. Additional details of the FSA performance for Case 24 are presented in Table 11 and Table 12.

For both tables, the rows and columns are described as follows. Row 1 corresponds to the Monte Carlo tests with the minimum state vector error provided by Sensor 1. Row 2 corresponds to the Monte Carlo tests with the minimum state vector error provided by Sensor 2. Row 3 corresponds to the Monte Carlo tests with the minimum state vector error provided by the fused estimator. Column 1 corresponds to the Monte Carlo tests with the selection of the state vector provided by Sensor 1. Column 2 corresponds to the Monte Carlo tests with the selection of the state vector provided by Sensor 2. Column 3 corresponds to the Monte Carlo tests with the selection of the state vector provided by the fused estimator.

The cells of Table 11 contain the frequency of occurrence. For example, the fused estimator is selected correctly to minimize the state vector error for 46.6% of the Monte Carlo tests. In an example, ideally, Table 11 is diagonal and there may be concern for large off-diagonal values. For example, the fused estimator is selected incorrectly rather than the Sensor 1 state vector for 24.3% of the Monte Carlo tests. Although this frequency of occurrence is high, the impact on the RMSE fusion performance metric is low, as indicated by the corresponding cell of Table 12. The cells of Table 12 contain the impact on the RMSE fusion performance metric for the FSA decisions. For example, the fused estimator is selected incorrectly rather than the Sensor 1 state vector with an RMSE impact of approximately −55.1. The negative sign indicates that the fused RMSE is larger than the Sensor 1 RMSE. Similarly, the Sensor 1 state vector is selected incorrectly rather than the fused estimator with an RMSE impact of approximately +123.7. The Fusion Selection Training Algorithm obtains the thresholds $T_1, T_2$ to minimize the RMSE for all Monte Carlo tests, resulting in the optimal combination of these errors.

TABLE 11

Fusion Benefit Frequency for Case 24

| True Min | S1 Selected | S2 Selected | Fused Selected |
|---|---|---|---|
| S1 | 0.170 | 0.000 | 0.243 |
| S2 | 0.006 | 0.000 | 0.041 |
| Fused | 0.074 | 0.000 | 0.466 |

TABLE 12

Fusion Metrics Differences for Case 24

| True Min | S1 Selected | S2 Selected | Fused Selected |
|---|---|---|---|
| S1 | −444.801 | 0.000 | −55.074 |
| S2 | 100.872 | 0.000 | 91.260 |
| Fused | 123.742 | 0.000 | 39.510 |

Figure 19:
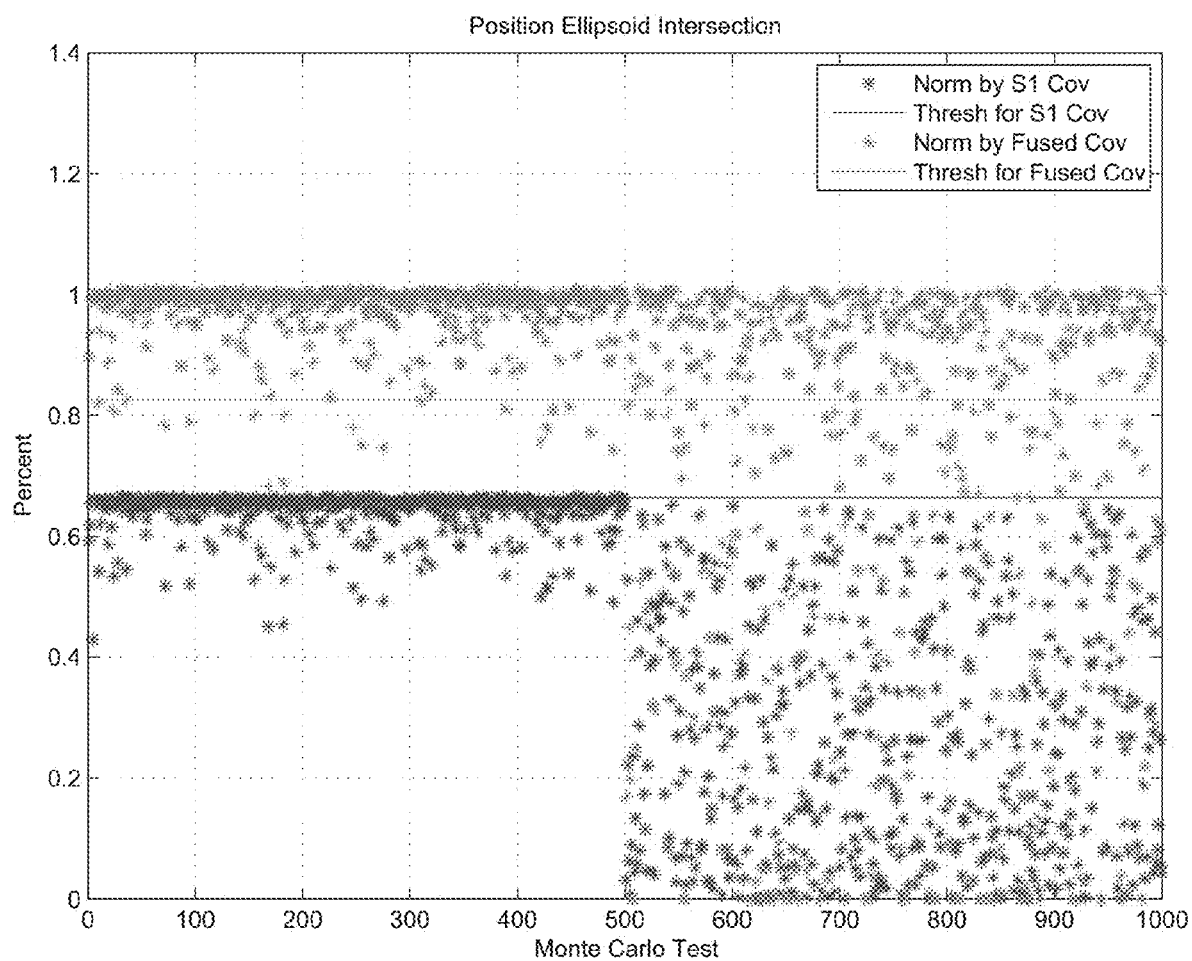
FIG. 19 shows a plot of ellipsoid intersection ratios for case 25.

According to results for dynamic covariance consistency, the ellipsoid intersection ratios for Case 25 are plotted in FIG. 19, including the thresholds $T_1, T_2$ for Case 22 from Table 10. For Case 25, Sensor 1 is in case 2 (consistent) and Sensor 2 is in case 5 (dynamic covariance consistency). Covariance $C_2$ changes dynamically from consistent with no scaling to a random scale factor in the interval [0.1, 1.0]. This may occur when Sensor 2 is the result of fusing multiple sensors and there is a change in the contributing sensors or the geometry of the tracking problem. For example, Sensor 2 may be the result of fusing two airborne IR sensors providing angle measurements alone and the geometry of the tracking problem changes because of the target motion. In this situation, the consistency of covariance $C_2$ may change suddenly.

After the transition time, the fused estimator is dominated by Sensor 2 and the results are less predictable than the consistent covariance case. Ratio $R_2$ is distributed throughout the interval [0, 1] and may be greater or less then the corresponding threshold $T_2$. Since threshold $T_1$ is utilized as an upper bound, there is essentially no constraint on the corresponding ratio $R_1$. Consequently, the FSA may select either the Sensor 1 or fused estimator, depending on the value of ratio $R_2$. This example demonstrates a significant advantage of the FSA by responding to dynamic changes to the tracking problem.

Figure 20:
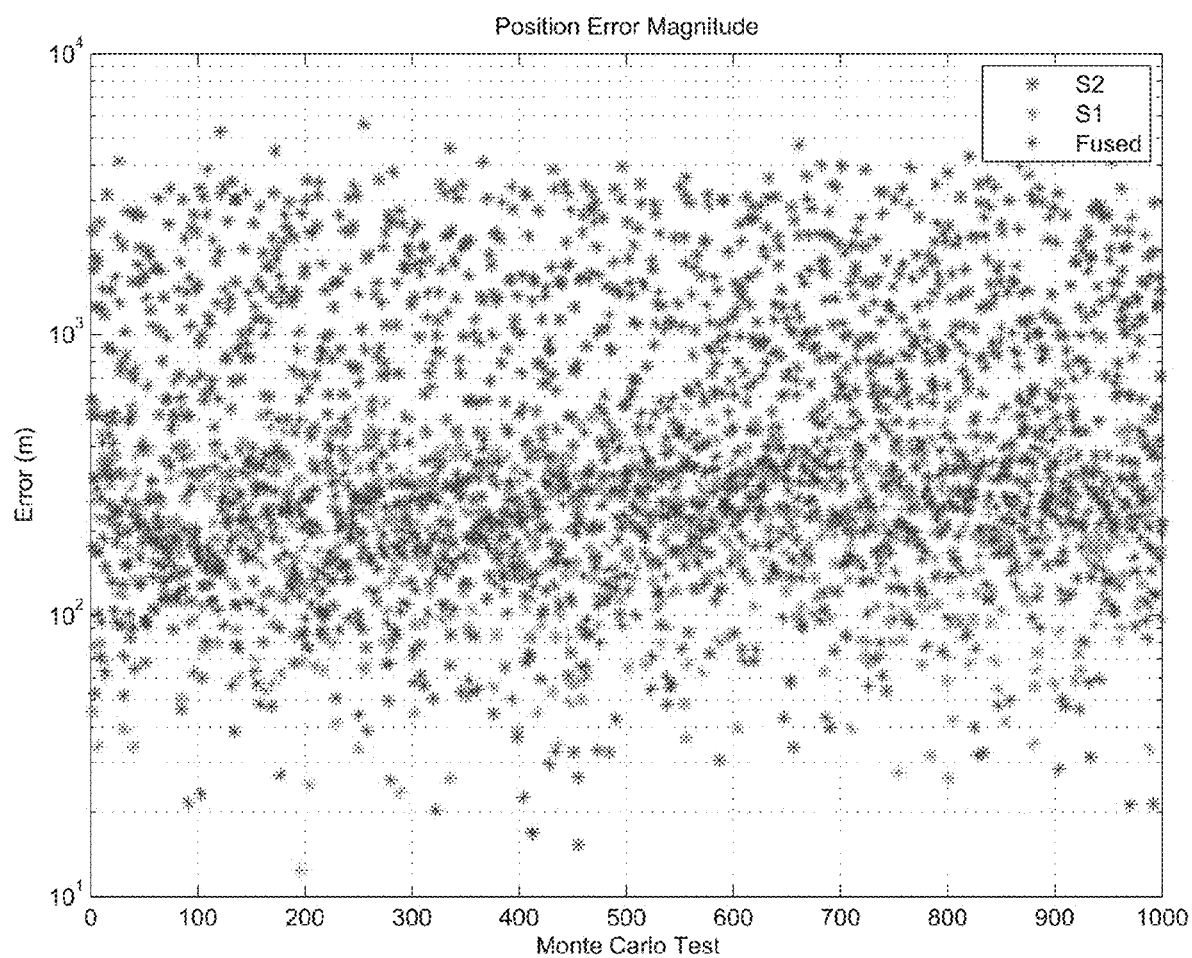
FIG. 20 shows a plot of fused position error magnitude for case 25.
Figure 21:
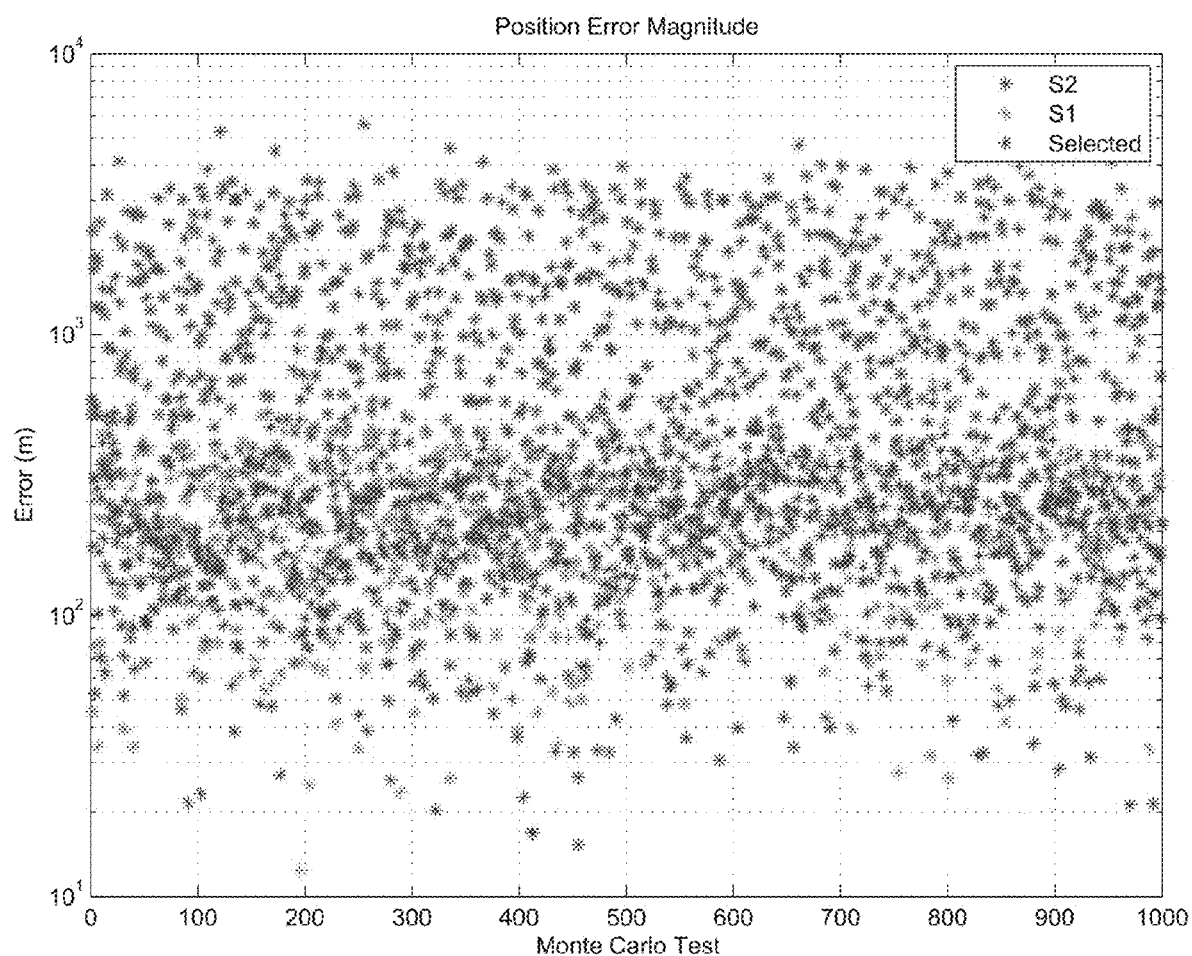
FIG. 21 shows a plot of selected position error magnitude for case 25.

The position error magnitudes for Sensor 1, Sensor 2 and the fused estimator for Case 25 are plotted FIG. 20. Note the large errors for the fused estimator, which occur when the scale factor for $C_2$ is close to the minimum value. The position error magnitudes for Sensor 1, Sensor 2 and the selected estimator for Case 25 are plotted in FIG. 21. The large errors for the fused estimator have been eliminated because the FSA selected the Sensor 1 state vector for those Monte Carlo tests.

According to an aspect of the disclosure, the FSA can be extended to measurement level fusion. In an example, Sensor 1 is the best sensor and Sensor 2 may have significantly larger measurement errors. In an example, time synchronized measurements from these sensors are required. This may be accomplished by interpolation or application of a Kalman Filter based tracking algorithm to the sensor measurements. The Kalman Filter state vector includes the filtered measurements, which may be propagated to a common time. The FSA may be applied to measurement level fusion by integration into an Extended Kalman Filter (EKF).

In an embodiment, the first intermediate state/covariance is obtained by updating with measurements from Sensor 1. The second intermediate state/covariance is obtained by updating with measurements from Sensor 2, which is the fused state/covariance. The final state/covariance is obtained by applying the FSA to the first and second intermediate results.

The fast algorithm for ellipsoid intersection volume, such as discussed with reference to FIG. 3, is used to enable an application of the FSA to measurement level fusion for high update rates (10 Hz).

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for sensor fusion, the method comprising:
receiving, by a processor, track reports of at least a first sensor and a second sensor of a plurality of sensors;
selecting a track report of the track reports as a best track report based on a priori knowledge of sensor performance or minimization of a volume of errors;
combining at least two or more track reports from different sensors as a fused track report;
calculating a first volume of errors in the best track report, a second volume of errors in the fused track report, and a third volume of intersection of the first volume and the second volume;
calculating a first ratio of the third volume normalized by the first volume and a second ratio of the third volume normalized by the second volume;
selecting one of the best track report and the fused track report as a system track report based on the first ratio and the second ratio; and
reducing an electronic system error based on the system track report.

2. The method of claim 1, wherein selecting one of the fused track report and the fused track report further comprises:
selecting the fused track report as the system track report when of the first volume of errors in the best track report contains the second volume of errors in the fused track report.

3. The method of claim 2, further comprising:
determining whether the first volume contains the second volume based on the third volume.

4. The method of claim 3, wherein determining whether the first volume contains the third volume further comprises:
determining that the first volume contains the second volume when the first ratio is smaller than a first threshold, and the second ratio is larger than a second threshold.

5. The method of claim 4, further comprising:
determining the first threshold and the second threshold based on simulated track reports.

6. The method of claim 1, wherein the best track report is a first best track report and the fused track report is a first fused track report, the system track report is a first system track report, the method further comprising:
selecting a second best track report from the first system track report and another track report from a third sensor of the plurality of sensors;
determining a second fused track report that combines the first system track report and the other track report;
selecting one of the second fused track report and the second best track report as a second system track report; and
reducing the electronic system error based on the second system track report.

7. An apparatus comprising:
circuitry including at least a processor, a memory, and a plurality of sensors, the circuitry configured to:
receive track reports of at least a first sensor and a second sensor of the plurality of sensors;
select a track report of the track reports as a best track report based on a priori knowledge of sensor performance or minimization of a volume of errors;
combine at least two or more track reports from different sensors as a fused track report;
calculate a first volume of errors in the best track report, a second volume of errors in the fused track report, and a third volume of intersection of the first volume and the second volume;
calculate a first ratio of the third volume normalized by the first volume and a second ratio of the third volume normalized by the second volume;
select one of the best track report and the fused track report as a system track report based on the first ratio and the second ratio; and
reduce an electronic system error based on the system track report.

8. The apparatus of claim 7, wherein the circuitry is further configured to:
select the fused track report when the first volume of errors in the best track report contains the second volume of errors in the fused track report.

9. The apparatus of claim 8, wherein the circuitry is further configured to:
determine whether the first volume contains the second volume based on the third volume.

10. The apparatus of claim 9, wherein the processor circuitry is further configured to:
determine that the first volume contains the second volume when the first ratio is smaller than a first threshold, and the second ratio is larger than a second threshold.

11. The apparatus of claim 10, wherein the processor circuitry is further configured to:
determine the first threshold and the second threshold based on simulated track reports.

12. The apparatus of claim 7, wherein the best track report is a first best track report and the fused track report is a first fused track report, the system track report is a first system track report, the circuitry is further configured to:
select a second best track report from the first fused track report and another track report from a third sensor of the plurality of sensors;
determine a second fused track report that combines the first fused track report and the other track report;
select one of the second fused track report and the second best track report as a second system track report; and
reduce the electronic system error based on the second system track report.

13. A non-transitory computer readable medium storing program instructions for causing a processor to execute operations for sensor fusion, the operations comprising:
receiving track reports of at least a first sensor and a second sensor of a plurality of sensors;
selecting a track report of the track reports as a best track report based on a priori knowledge of sensor performance or minimization of a volume of errors;
combining at least two or more track reports from different sensors as a fused track report;
calculating a first volume of errors in the best track report, a second volume of errors in the fused track report, and a third volume of intersection of the first volume and the second volume;
calculating a first ratio of the third volume normalized by the first volume and a second ratio of the third volume normalized by the second volume;
selecting one of the best track report and the fused track report as a system track report based on the first ratio and the second ratio; and
reducing an electronic system error based on the system track report.

14. The non-transitory computer readable medium of claim 13, wherein selecting one of the best track report and the fused track report further comprises:
selecting the fused track report when the first volume of errors in the best track contains the second volume of errors in the fused track report.

15. The non-transitory computer readable medium of claim 14, wherein selecting the fused track report comprises:
determining whether the first volume contains the volume based on the third volume.

16. The non-transitory computer readable medium of claim 15, wherein determining whether the first volume contains the second volume further comprises:
determining that the first volume contains the second volume when the first ratio is smaller than a first threshold, and the second ratio is larger than a second threshold.

17. The non-transitory computer readable medium of claim 13, wherein the best track report is a first best track report and the fused track report is a first fused track report, the system track report is a first system track report, further comprising:
selecting a second best track report from the first fused track report and another track report from a third sensor of the plurality of sensors;
determining a second fused track report that combines the first fused track report and the other track report;
selecting one of the second fused track report and the second best track report as a second system track report; and
reducing the electronic system error based on the second system track report.

* * * * *